US011627575B2

(12) United States Patent
Elshafie et al.

(10) Patent No.: US 11,627,575 B2
(45) Date of Patent: Apr. 11, 2023

(54) PHYSICAL LAYER SECURITY WITH COMPONENT CARRIER SWITCHING

(71) Applicant: QUALCOMM Incorporated, San Diego, CA (US)

(72) Inventors: Ahmed Elshafie, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/342,440

(22) Filed: Jun. 8, 2021

(65) Prior Publication Data

US 2022/0394713 A1 Dec. 8, 2022

(51) Int. Cl.
*H04W 72/04* (2009.01)
*H04W 72/0453* (2023.01)
*H04W 12/033* (2021.01)
*H04L 5/00* (2006.01)

(52) U.S. Cl.
CPC ....... *H04W 72/0453* (2013.01); *H04L 5/0048* (2013.01); *H04L 5/0055* (2013.01); *H04W 12/033* (2021.01)

(58) Field of Classification Search
CPC ............ H04W 72/0453; H04W 12/033; H04L 5/0048; H04L 5/0055
USPC ........................................................ 370/329
See application file for complete search history.

(56) References Cited

U.S. PATENT DOCUMENTS

| 2013/0094392 | A1* | 4/2013 | Kim ...................... H04L 1/0026 370/252 |
| 2013/0223272 | A1* | 8/2013 | Tao ................... H04W 72/0426 370/252 |
| 2013/0322276 | A1* | 12/2013 | Pelletier .............. H04W 72/085 370/252 |
| 2015/0296466 | A1* | 10/2015 | Takano ............... H04W 72/042 370/350 |
| 2017/0222671 | A1* | 8/2017 | Jin .......................... H04W 8/24 |
| 2019/0150197 | A1* | 5/2019 | Sheu ................. H04W 72/1242 370/329 |

* cited by examiner

*Primary Examiner* — Mang Hang Yeung
(74) *Attorney, Agent, or Firm* — Danai Nelisile Mhembere; Procopio, Cory, Hargreaves & Savitch LLP

(57) ABSTRACT

The base station may transmit, to a UE, a configuration of a set of secure RSs for each CC of a set of CCs and at least one RE, and instruct the UE to select a subset of CCs from a set of CCs. The base station and the UE may measure the set of secure RS across the at least one RE, and select the subset of CCs from the set of CCs based on the measurement. The base station and the UE may communicate with each other on the subset of CCs. The base station and the UE may communicate with each other on a first CC of the subset of CCs, and switch the CC from the first CC to a second CC of the subset of CCs to communicate with each other, based on a number of ACKs/NACKs transmitted or a pattern.

30 Claims, 12 Drawing Sheets

PHYSICAL LAYER SECURITY WITH COMPONENT CARRIER SWITCHING

TECHNICAL FIELD

The present disclosure relates generally to communication systems, and more particularly, to a method of wireless communication including component carrier (CC) switching.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and a user equipment (UE). The base station may transmit, to the UE, a configuration of a secure uplink RS and a secure downlink reference signal (RS) for each CC of a set of CCs and at least one resource element (RE), and instruct the UE to select a subset of CCs from a set of CCs. The base station may measure the secure uplink RS received from the UE across the at least one RE, and select the subset of CCs from the set of CCs based on the measurement. The UE may measure the secure downlink RS received from the base station across the at least one RE, and select the subset of CCs from the set of CCs based on the measurement. Also, the base station and the UE may apply a metric or a mapping function to the measurement to select the subset of CCs.

The base station and the UE may communicate with each other on the subset of CCs. The base station and the UE may communicate with each other on a first CC of the subset of CCs, and switch the CC from the first CC to a second CC of the subset of CCs to communicate with each other. The switching of the CC may be based on a number of acknowledgements (ACKs)/negative acknowledgements (NACKs) transmitted between the base station and the UE or a pattern.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
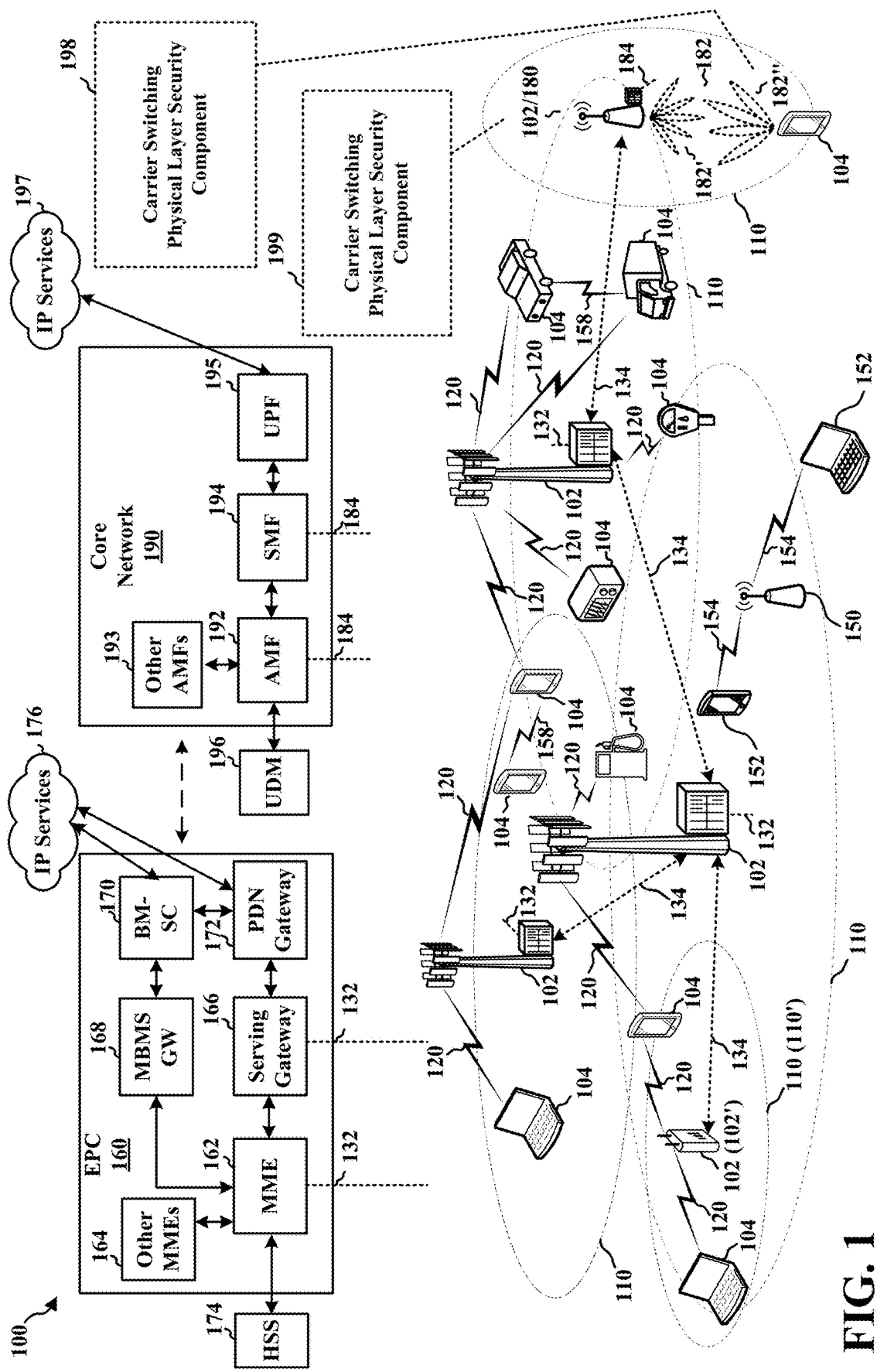
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-Sb 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ES S), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a carrier switching physical layer security component 198 configured to receive, from a base station, a configuration of a secure downlink RS for each CC of a set of CCs, receive an instruction to select a subset of CCs from the set of CCs, measure the secure downlink RS in at least one RE in each CC of the set of CCs, determine the subset of CCs based on the measured secure downlink RS in the at least one RE in each CC of the set of CCs, and communicate with the base station on at least one CC of the determined subset of CCs. In certain aspects, the base station 180 may include a carrier switching physical layer security component 199 configured to transmit, to a UE, a configuration of a secure uplink RS for each CC of a set of CCs, transmit, an instruction to select a subset of CCs from a set of CCs, receive an ACK from the UE in response to transmitting the instruction to select the subset of CCs from the set of CCs, measure the secure uplink RS in at least one RE in each CC of the set of CCs, determine the subset of CCs based on the measured secure uplink RS in the at least one RE in each CC of the set of CCs, and communicate with the UE on at least one CC of the determined subset of CCs. Although the following description may be focused on 5G NR, the concepts described herein may be applicable to other similar areas, such as LTE, LTE-A, CDMA, GSM, and other wireless technologies.

Figure 2:
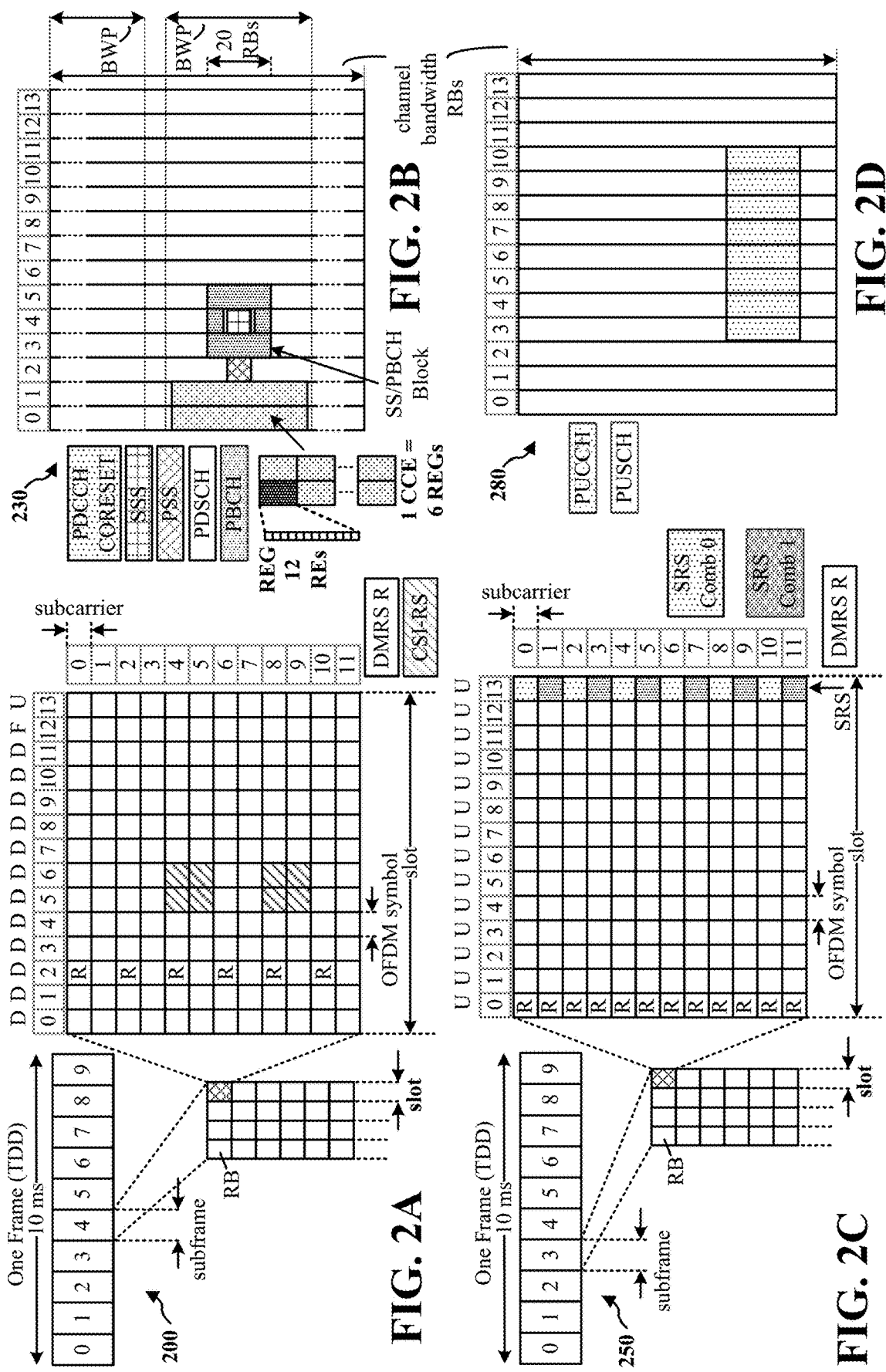
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$ there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
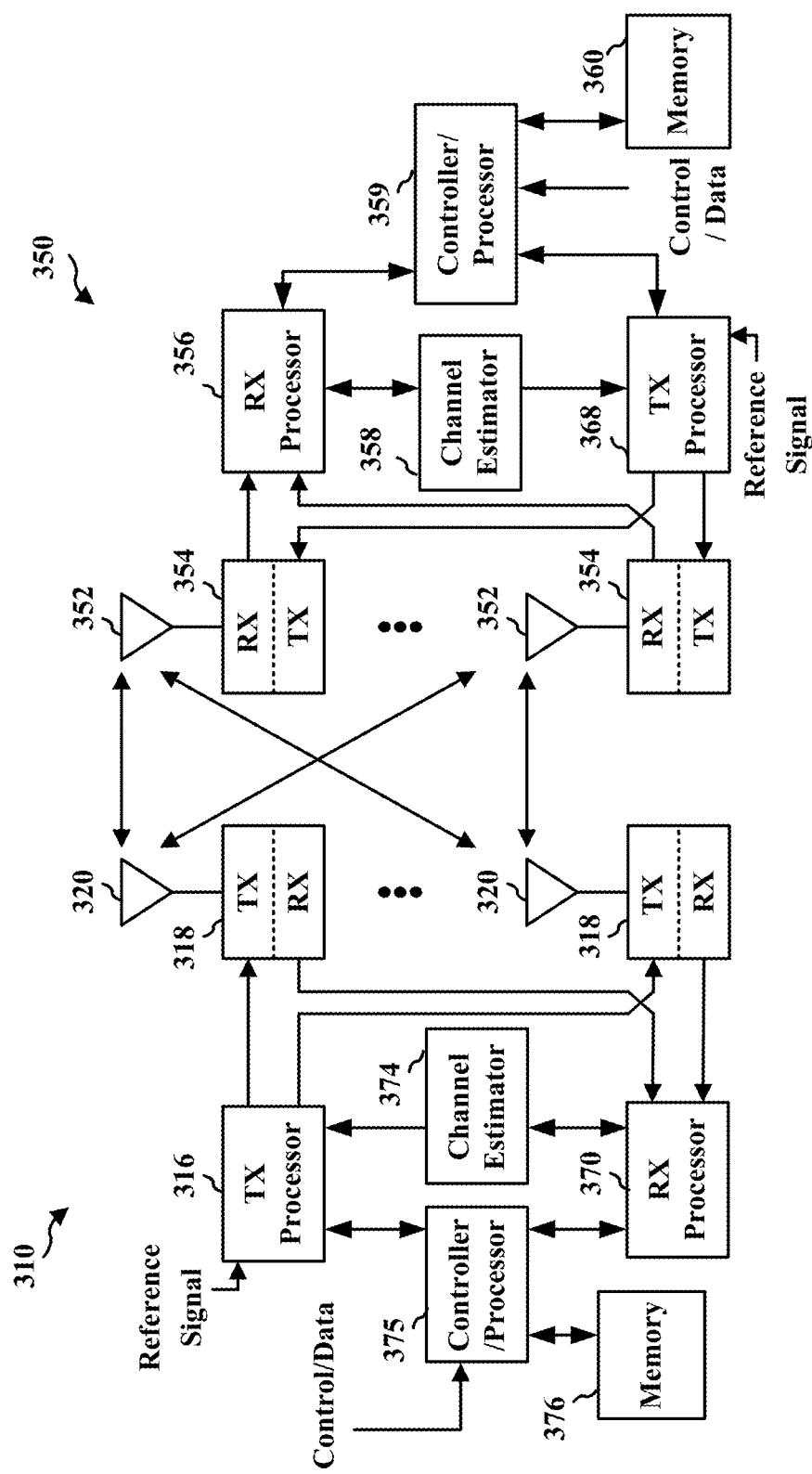
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects, secure communications may be established between a first wireless device and a second wireless device in a wireless communications systems to ensure that a wireless communication signal between the two devices is not received by an eavesdropping device. The wireless communication may provide one or more wireless communication security measures to prevent the eavesdropping device from interrupting or participating in the wireless communication signal between the first and second wireless devices and to prevent the eavesdropping device from decoding the content of the wireless communication signal between the first and second wireless devices. Various security measures may include a higher-layer security scheme, such as encoding or encryption of the data, to prevent the eavesdropping device from receiving the wireless communication signal or decoding the content of the wireless communication signal. In one aspect, a user equipment (UE) may have some hardware capability, including the processing power or the power consumption margin, to support an additional security measure on the physical layer, i.e., the L1 layer.

For example, wireless communication security may be important for an internet of things (IoT) device (IoT device) because many IoT devices may be connected to each other, and certain channels may not be protected by a higher-layer security scheme. Accordingly, aspects presented herein provide an additional security measure from the perspective of the physical layer with additional secure bits obtained from channels and sounding signals between the first wireless device and the second wireless device.

The examples of the present disclosure may confuse the and share secure data bits among wireless devices using channel randomness, e.g., through carrier component (CC) switching that creates confusion for eavesdropping devices and prevents the eavesdropping device from decoding the data.

Figure 4:
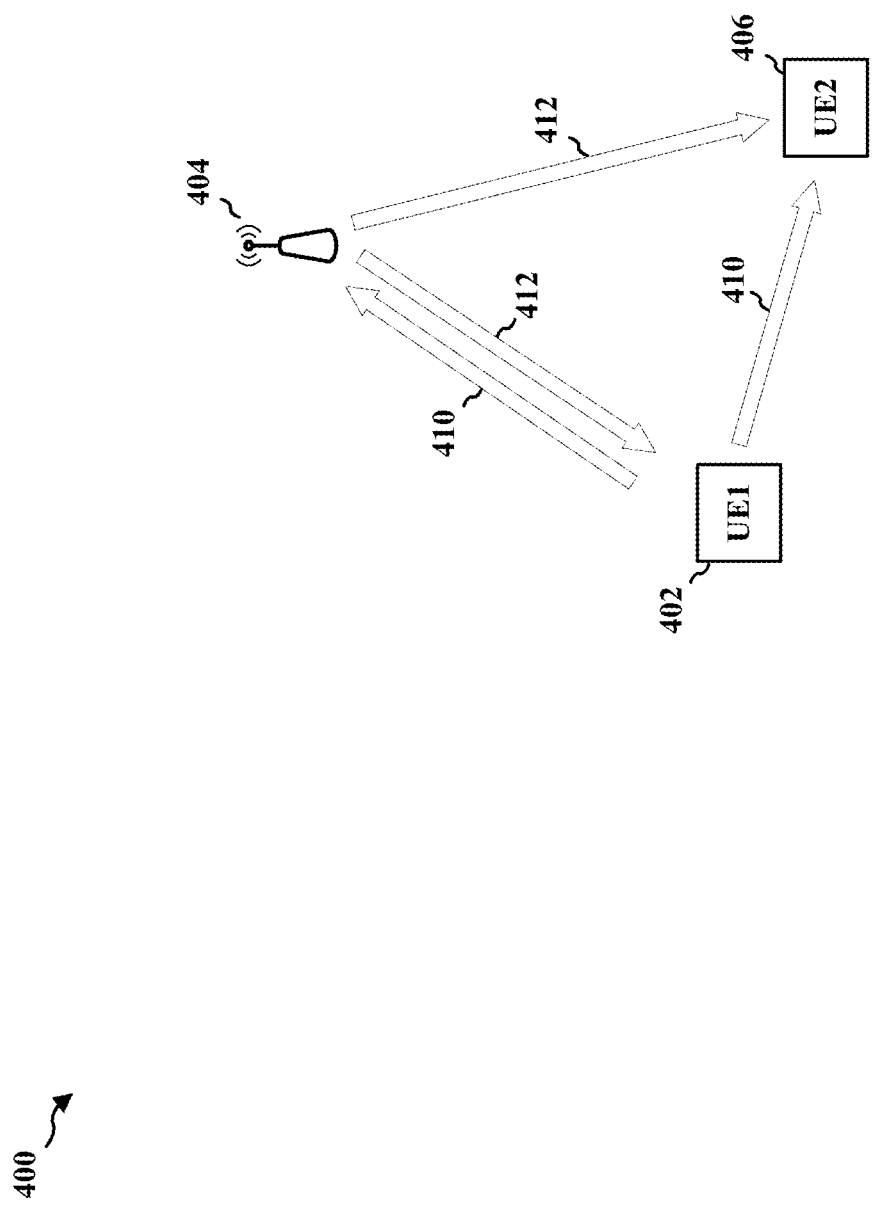
FIG. 4 is a diagram illustrating an example of a wireless communication system.

FIG. 4 is a diagram illustrating an example 400 of a wireless communication system. The example 400 may include a first UE 402 and a base station 404, and a second UE 406. Here, the first UE 402 and the base station 404 may communicate with each other, and the second UE 406 may be eavesdropping on the communication between the first UE 402 and the base station 404. That is, the first UE 402 may transmit a UL signal 410 to the base station 404 and the base station 404 may transmit a DL signal 412 to the first UE 402, and the second UE 406 may attempt to decode the UL signal 410 transmitted by the first UE 402 and/or the DL signal 412 transmitted by the base station 404.

The first UE 402 and the base station 404 may provide a higher layer security scheme to prevent the second UE 406 from decoding the content of the communication signal based on the UL signal 410 or the DL signal 412. In some aspects, a physical layer security scheme that depends on channel characteristics may be further provided to enhance the security of the control and data channels on the UL signal 410 and the DL signal 412. For example, the first UE 402 and the base station 404 may provide physical layer security by transmitting the communication signal on CCs that are unknown to the second UE 406. That is, the first UE 402 and the base station 404 may switch the CC in a way that is unknown to the second UE 406, and the second UE 406 may not be able to decode the data of the communication signal between the first UE 402 and the base station 404. The first UE 402 and the base station 404 may perform the CC switching based on the channel randomness and sounding signals.

A plurality of CCs may be available to carry the communication signal between the first UE 402 and the base station 404. That is, the first UE 402 and the base station 404 may transmit the UL/DL signal on one or more CCs of the plurality of CCs. Each CC of the plurality of CCs may have its own set of BWPs, RB allocations, etc. The base station 404 may assign multiple CCs of the plurality of CCs available for the first UE 402 and the base station 404. The base station 404 and the UE 402 may secure the data transmitted in the UL/DL signal by randomly selecting the one or more CCs for transmitting UL/DL channels. The second UE 406 may not decode the data transmitted on randomly selected unless the second UE 406 successfully decodes all potential data from all CCs including all the BWPs and RB allocated for each of the CCs.

FIGS. 5A, 5B, 5C, and 5D are examples 500, 520, 540, and 560 of CCs of a method of wireless communication. The example of CCs of the method of wireless communication may include a plurality of CCs. The plurality of CCs may be available to carry the communication signal between a UE and a base station. The first example 500 includes ten CCs on which the base station and the UE may communicate with each other. The second example 520 illustrates three selected CCs, including CC0 522, CC4 524, and CC9 526, and that the base station and the UE are communicating on CC0 522. The third example 540 illustrates three selected CCs, including CC0 542, CC4 544, and CC9 546, and that the base station and the UE are communicating on CC4 544. The fourth example 560 illustrates three selected CCs, including CC0 562, CC4 564, and CC9 566, and that the base station and the UE are communicating on CC9 566.

Figure 5A:
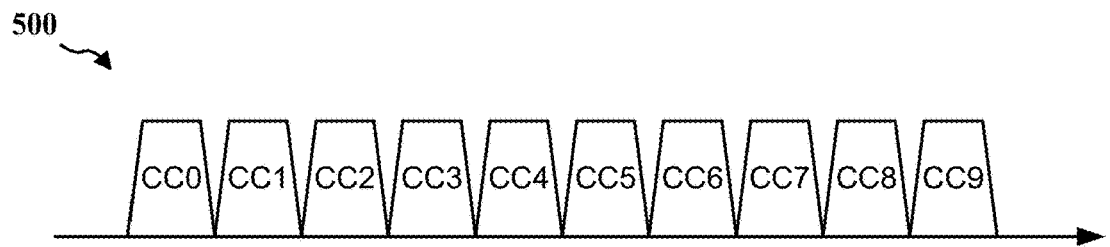
FIGS. 5A, 5B, 5C, and 5D are examples of component carriers of a method of wireless communication.

FIG. 5A is an example 500 of CCs of a method of wireless communication. Here, the first example 500 may include ten (10) CCs including CC0, CC1, CC2, CC3, CC4, CC5, CC6, CC7, CC8, and CC9; however, the examples of the present disclosure are not limited thereto, and the examples of CCs of the method of wireless communication may include any applicable number of CCs. Also, the examples 500, 520, 540, and 560 may illustrate that the ten (10) CCs are contiguous component carriers; however, the examples of the present disclosure are not limited thereto, and the CC of the method of wireless communication may include one or more non-contiguous CCs.

In some aspects, the base station may configure a plurality of reference signals (RSs). For example, the base station may configure a plurality of RS including CSI-RS, SRS, etc., and corresponding resources. The base station and the UE may use the plurality of RSs and the corresponding resources configured by the base station to estimate the UL/DL channels or estimate the quality of the UL/DL channels. For example, the UE may receive the CSI-RS and estimate the downlink channels based on the CSI-RS, and the base station may estimate the channel quality based on the SRS received from the UE.

In some aspects, the base station may configure a set of secure RSs to provide physical layer security. That is, the base station may configure the set of secure RSs for selecting a CC to communicate for both the base station and the UE, and the base station and the UE may measure the set of secure RSs to select the CC to carry the UL/DL channels for communication. The set of secure RSs may include a secure downlink RS, such as a physical security CSI-RS, which may be referred to herein as a Secure_DL_CSI-RS, and a secure uplink RS, such as a physical security SRS, which may be referred to herein as a Secure_UL_SRS. In one example, the base station may transmit the secure downlink RS, e.g., the Secure_DL_CSI-RS for the UE to measure to determine the CC for communication. In another example, the UE may transmit the secure uplink RS, e.g., Secure_UL_SRS for the base station to measure to determine the CC for communication. In one aspect, the set of secure RSs may be configured differently from the plurality of RSs. In another aspect, the set of secure RSs may be a set of RSs from the plurality of RSs instructed by the base station to use to provide the physical layer security.

In some aspects, the base station may transmit, to the UE, the configuration of the set of secure RSs via the RRC message, the MAC-CE, or the DCI. In one aspect, the base station may configure the set of secure RSs for the UE via the RRC message, the MAC-CE, or the DCI. In another aspect, the base station may configure multiple sets of secure RSs for the UE via the RRC message, and the base station may transmit the MAC-CE or the DCI to activate/deactivate, select, switch, or change one set of secure RSs for the UE to use to provide the physical layer security. In another aspect, a default set of secure RSs may be configured for the base station and the UE to use in the absence of the configuration from the base station.

The base station and the UE may select the one or more CCs based on the measurements of the set of secure RSs, including the secure downlink RS, e.g., the Secure_DL_CSI-RS or the secure uplink RS, e.g., the Secure_UL_SRS. The base station may configure the set of secure RSs and the corresponding resources to follow the channel reciprocity so that the base station and the UE may select the same set of the one or more CCs. That is, the base station may configure the set of secure RSs with the resources on the same BWP (UL/DL) and quasi co-located (QCLed) to sound the same channel.

According to the first example 500, the plurality of CCs including the ten CCs may be available for transmitting the UL/DL channels between the base station and the UE. The base station may instruct the UE to select the one or more CCs from the plurality of CCs including the ten CCs. That is, the base station may determine to provide the physical layer security by switching the CC and instruct the UE to measure the downlink RS, e.g., the Secure_DL_CSI-RS, transmitted by the base station and transmit the uplink RS, e.g., Secure_UL_SRS to the base station. The instruction to select the one or more CCs may be transmitted to the UE via DCI or a medium access control—control element (MAC-CE). For example, the second example 520, the third example 540, or the fourth example 560 may provide that the base station and the UE may select three CCs, e.g., CC0, CC4, and CC9, based on the measurement of the set of secure RSs and the resources.

The UE may receive the instruction to select the one or more CCs from the base station and transmit an acknowledgment (ACK) message to the base station. The base station and the UE may initiate the process of CC switching to provide the physical layer security in response to transmitting and receiving the ACK message. That is, in response to receiving the ACK message from the UE, the base station may transmit the secure downlink RS to the UE and measure the secure uplink RS received from the UE, and the UE may transmit the secure uplink RS to the base station and measure the secure downlink RS received from the base station.

The base station may configure at least one resource element (RE) of the set of secure RSs for the base station and the UE, and the base station and the UE may select the one or more CCs based on at least one measurement of the set of secure RSs across the at least one RE. That is, the base station and the UE may select the one or more CCs from the plurality of CCs based on certain resources of the secure downlink RS, e.g., CSI-RS and/or certain resources of the secure uplink RS, e.g., SRS, agreed between the base station and the UE. In one aspect, the base station and the UE may measure at least one RE of the set of secure RSs on the plurality of CCs and select the one or more CCs from the plurality of CCs based on the measurements of the set of secure RSs on the plurality of CCs across the set of secure RSs. For example, the base station and the UE may measure reference signal received power (RSRP), received signal strength indicator (RSSI), eigenvalues, etc., of the at least one RE of the set of secure RSs on the plurality of CCs.

In some aspects, the base station may transmit, to the UE, the configuration of the at least one RE of the set of secure RSs via the RRC message, the MAC-CE, or the DCI. In one aspect, the base station may configure the at least one RE of the set of secure RSs for the UE via the RRC message, the MAC-CE, or the DCI. In another aspect, the base station may configure multiple sets of REs of the set of secure RSs for the UE via the RRC message, and the base station may transmit the MAC-CE or the DCI to activate/deactivate, select, switch, or change one set of at least one RE from the multiple sets of at least one RE of the set of secure RSs for the UE to measure. In another aspect, a default REs may be configured for the base station and the UE, and the base station and the UE may use the default REs in the absence of the configuration from the base station.

The base station may configure a metric or a mapping function for the base station and the UE to apply to the measurement of the set of secure RSs across the at least one RE, and the base station and the UE may select the one or more CCs based on the outcome of the metric or the mapping function applied to the at least one measurement of the set of secure RSs across the at least one RE. That is, the base station may configure the metric or mapping function that the base station and the UE may use to determine the one or more CCs from the plurality of CCs for transmitting the UL/DL channels. For example, the metric or the mapping function may include a sum or an average of the measurement, e.g., RSRP, RSSI, eigenvalues, etc., of the channels (DL/UL) estimated based on the set of secure RSs across the at least one RE instructed by the base station, and the base station and the UE may determine the one or more CCs from the plurality of CCs that have the greatest sum or average of the measurements of the set of secure RSs across the at least one RE than other CCs.

In some aspects, the base station may transmit, to the UE, the configuration of the metric or the mapping function via the RRC message, the MAC-CE, or the DCI. In one aspect, the base station may configure the metric or the mapping function for the UE via the RRC message, the MAC-CE, or the DCI. In another aspect, the base station may configure multiple metrics or mapping functions for the UE via the RRC message, and the base station may transmit the MAC-CE or the DCI to activate/deactivate, select, switch, or change one of the metric or the mapping function for the UE to measure. In another aspect, a default metric or a default mapping function may be configured for the base station and the UE, and the base station and the UE may use the default metric or the default mapping function in the absence of the configuration from the base station.

In some aspects, the base station and the UE may be configured to use the selected one or more CCs for the next L time units, e.g., transmissions, slots, or milliseconds (ms). That is, the base station and the UE may use the selected one or more CCs for a number of subsequent transmissions, slots, or ms. In one aspect, the number of subsequent transmissions, slots, or time units to use the selected one or more CCs may be configured by the base station and instructed to the UE via the RRC message, the MAC-CE, or the DCI. In another aspect, the base station may configure multiple candidates for the number of the subsequent transmissions, slots, or time units to use the selected one or more CCs, and the base station may transmit the MAC-CE or the DCI to activate/deactivate, select, switch, or change one number of the subsequent transmissions and the base station and the UE may use the selected one or more CCs for the next L transmissions, slots, or time units.

Accordingly, the base station and the UE may provide physical layer security by selecting one or more CCs for communicating the UL/DL signals based on the measurements of the set of secure RSs to limit or prevent the eavesdropping device from successfully receiving the UL/DL signals. Particularly, the base station and the UE may select the CCs for transmitting the UL/DL channels based on the measurements of the set of secure RSs, the metric or the mapping functions to compute the measurements of the set of secure RSs, and/or the at least one RE of the set of secure RSs that the base station and the UE may measure the set of secure RSs, and since the eavesdropping device may have different channel status and location in relation to the base station, the eavesdropping device may not predict the one or more CCs that the base station and the UE may select. Furthermore, the base station and the UE may select the same set of one or more CCs without explicitly exchanging the list of the one or more CCs, the information of the one or more CCs for transmitting the UL/DL channels between the base station and the UE may be securely protected from the eavesdropping device.

Referring to the first example 500, the base station may measure the secure uplink RS in each of the 10 CCs across the at least one RE and select three CCs, e.g., CC0, CC4, and CC9, that have the greatest measurements among the 10 CCs. The base station and the UE may make the selection based on a measurement, e.g., RSRP, RSSI, eigenvalues, etc., of the set of secure RSs, including the secure uplink RS and the secure downlink RS. In one example, the base station and the UE may select the three CCs, e.g., CC0, CC4, and CC9, based on the measurement of the set of secure RSs across the at least one RE configured by the base station. That is, the base station and the UE may, among all the REs of the set of secure RSs, consider the measurement of at least one RE of the set of secure RSs as the basis to determine that the base station and the UE may use the three CCs including CC0, CC4, and CC9. In another example, the base station and the UE may apply the metric or the mapping function configured by the base station and select the three CCs including CC0, CC4, and CC9 based on the outcome of the metric or the mapping function applied to the measurement of the set of secure RSs. In another example, the base station and the UE may use the three CCs including CC0, CC4, and CC9 for the next 30 slots.

Figure 5B:
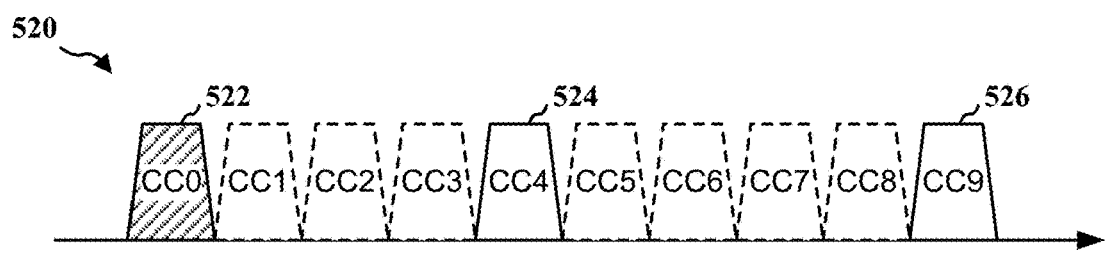
Figure 5C:
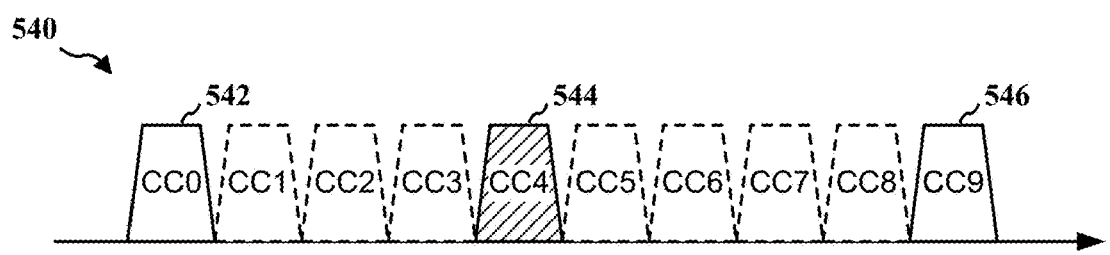
Figure 5D:
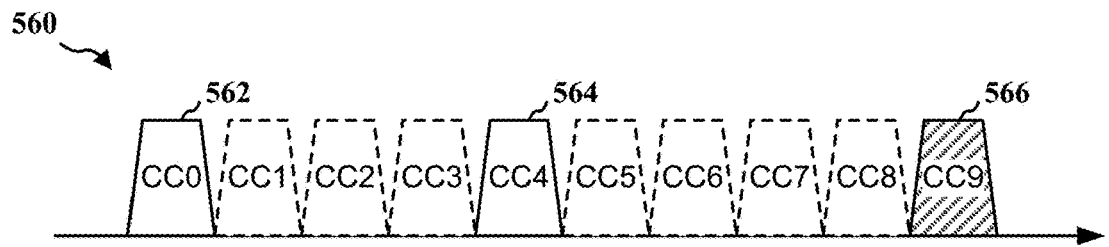

FIGS. 5B, 5C, and 5D are the second example 520, the third example 540, and the fourth example 560 of CCs of a method of wireless communication. The second example 520, the third example 540, and the fourth example 560 show the CC switching between the one or more CCs selected by the base station and the UE. That is, the base station and the UE may switch the CC between the one or more CCs selected by the base station and the UE within the L transmissions, slots, or time units.

In some aspects, the base station and the UE may select the best R CCs (here, R is a number of the selected one or more CCs) with the highest values for transmissions based on the metric or the mapping function, and the base station may switch between the selected R CCs based on a regular operation, certain events, or a metric. That is, the base station and the UE may downselect the plurality of CCs to one or more CCs based on the measurements of the set of secure RSs, and the base station and the UE may switch CC between the selected one or more CCs. For example, the second example 520 provides that the base station and the UE may downselect the ten CCs into the three CCs, i.e., CC0 522, CC4 524, and CC9 526, i.e., R=3, based on the outcome of the metric or the mapping function of the measurements of the set of secure RSs across the at least one RE, and the base station and the UE may manage, e.g., switch CC, within the selected one or more CCs including the three CCs, i.e., CC0 522, CC4 524, and CC9 526. The second example 520 shows that the base station and the UE may initially communicate on the CC0 522.

In some aspects, the base station and the UE may switch the CC based on explicit instruction or configuration received from the base station. That is, within the L transmissions, slots, or time units, the base station may instruct the UE to switch CC from one CC to another within the selected one or more CCs. In one aspect, the base station may explicitly instruct the UE to switch to a new CC, and the base station and the UE may switch to the new CC to transmit the UL/DL channels. For example, referring to FIGS. 5B and 5D, the base station communicating with the UE on the CC0 522 may instruct the UE to switch the CC from the CC0 522 to CC9 526, within the selected one or more CCs. Accordingly, the base station and the UE may switch the CC to communicate on the CC9 566. In another aspect, referring to FIGS. 5B, 5C, and 5D, the base station and the UE may sequentially switch the CC based on an instruction from the base station to switch the CC. That is, the base station communicating with the UE on the CC0 522 may instruct the UE to switch the CC, and the base station and the UE may sequentially switch the CC to CC4 544 and to CC9 566. For example, the base station communicating with the UE on the CC0 522 may instruct the UE to switch the CC, and the base station and the UE may switch to the CC4 544 within the selected one or more CCs. The sequence of the CC switch is not limited thereto, and any applicable sequence may be used. For example, the base station and the UE may switch the CC based on the rank of the measurements of the selected one or more CCs. For example, the base station and the UE may switch from CC0 522 to CC9 566 if the measurement of CC9 was better than CC4.

In some aspects, the switching order can be RRC/MAC-CE configured. That is, the base station may configure the order of the CC switch via the RRC message or MAC-CE.

The base station and the UE may order or index the selected one or more CCs based on the original sequence after removing the unselected CCs indices. That is, the base station and the UE may disregard the unselected CCs and manage the selected one or more CCs using sequential downselected indices independent from the original index of the CCs. Accordingly, the base station may refer to the downselected indices to explicitly instruct the UE to switch the CC, without letting the eavesdropping device understand the information of the CC switching between the base station and the UE. For example, the second example 520 provides that the base station and the UE may downselect the ten CCs into the three CCs, i.e., CC0, CC4, and CC9. The base station and the UE may apply the downselected indices 0, 1, and 2 in sequence to the three selected CCs and refer to the selected CCs using the downselected indices. That is, index 0 means CC0 is used, index 1 means that CC4 is used, the index 2 means that CC9 is used. For example, the base station may instruct the UE to switch the CC from a CC with index 0 to a CC with index 1 within the selected one or more CCs, and the base station and the UE may switch from the CC0 to the CC4, without specifying that the CC switching is from the CC0 to the CC4.

In some aspects, the base station and the UE may switch the CC based on a number of ACKs or NACKs transmitted between the base station and the UE. That is, the base station and the UE may determine to switch without an explicit instruction to switch based on the number of ACKs or NACKs transmitted between the base station and the UE being smaller than or greater than or equal to threshold values.

In one aspect, the base station and the UE may switch the CC based on the number of the ACKs transmitted between the base station and the UE within a time window being smaller than a first threshold value. That is, if the base station and the UE determines that the number of the ACKs transmitted within the time window is smaller than the first threshold value, the base station and the UE may switch the CC to another CC within the selected one or more CCs. For example, referring to FIGS. 5B and 5C, the base station communicating with the UE on the CC0 522 may detect that the number of the ACKs transmitted within the time window is smaller than the first threshold value and instruct the UE to switch the CC to CC4 544.

In another aspect, the base station and the UE may switch the CC based on the number of NACKs transmitted between the base station and the UE is greater than or equal to a second threshold value. That is, if the base station and the UE determines that the number of the NACKs transmitted is greater than or equal to the second threshold value, the base station and the UE may switch the CC to another CC within the selected one or more CCs. For one example, referring to FIGS. 5B and 5C, the base station communicating with the UE on the CC0 522 may detect that the number of the NACKs transmitted is greater than or equal to the second threshold value and instruct the UE to switch the CC to CC4 544. For another aspect, the CC switching may be based on more than one threshold value. Referring to FIGS. 5B, 5C, and 5D, the base station communicating with the UE on the CC0 522 may instruct the UE to switch the CC to CC4 544 based on observing transmissions of $X_1$ NACKs, and may further instruct the UE to switch the CC to CC9 566 based on observing transmissions of $X_2$ NACKs. The base station may refer to C0 522, CC4 544, and CC6 566 with the downselected indices 0, 1, and 2.

In some aspects, the base station and the UE may periodically switch between the one or more CCs selected from the plurality of CCs. That is, the base station and the UE may be configured to use the selected one or more CCs for the next L time units, e.g., transmissions, slots, or milliseconds (ms), and L may be L=K×M, where K may refer to the number of downselected CCs, and the base station and the UE may use each CC for M time units before switching the CC. In some aspects, the base station and the UE may keep switching in round-robin or between CCs within the selected one or more CCs based on a pattern. For example, referring to FIGS. 5A, 5B, 5C, and 5D, the base station and the UE may select three CCs including CC0, CC4, and CC9 for the next 30 slots. That is, the base station and the UE may sequentially switch the CC between the three CCs every 10 slots, and for the next 30 slots, the base station and the UE may transmit the UL/DL channels on the CC0 522 for the first 10 slots, on the CC4 554 for the subsequent 10 slots, and on the CC9 556 for the last 10 slots.

In some aspects, the patterns may be shared via the RRC message, the MAC-CE, or the DCI, or be based on the ACK/NACK events. The patterns may also be based on the default pattern of CCs or some indexing that is configured for the base station and the UE. In some aspects, the pattern (or a sequence) may be instructed by the base station via the RRC message, the MAC-CE, or the DCI. In one aspect, the pattern may be configured by the base station via the RRC message, the MAC-CE, or the DCI, and the base station and the UE may periodically switch between the selected one or more CCs based on the configuration. In another aspect, the base station may configure multiple patterns via the RRC message and transmit the MAC-CE or the DCI to activate/deactivate, select, switch, or change one pattern among the multiple patterns configured via the RRC message, and the base station and the UE may use the pattern to periodically switch between the selected one or more CCs.

Accordingly, the base station and the UE may perform CC switching within the selected one or more CCs to further improve the physical layer security. The base station and the UE may increase the complexity of the physical layer security without an additional measurement of the set of secure RSs and may reduce the possibility that the eavesdropping device may successfully predict the CC that the base station and the UE may use to communicate the UL/DL signal.

Figure 6:
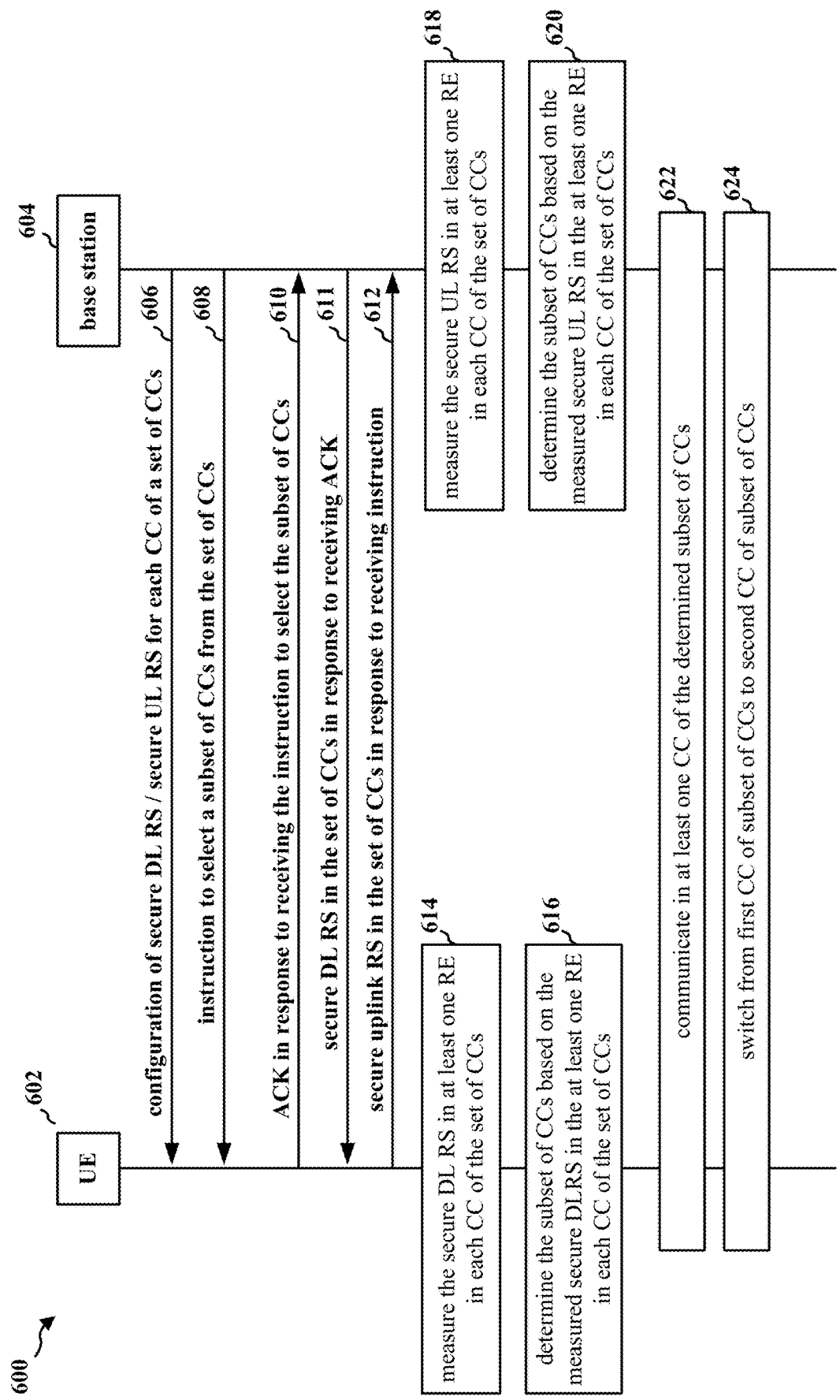
FIG. 6 is a communication diagram of a method of wireless communication.

FIG. 6 is a communication diagram 600 of a method of wireless communication. The communication diagram 600 may include a UE 602 and a base station 604. A plurality of CCs (a set of CCs) may be available for the base station 604 and the UE 602, and the base station 604 and the UE 602 may select one or more CCs (a subset of CCs) from the plurality of CCs based on the measurements of the set of secure RSs, and perform CC switching within the selected one or more CCs to provide physical layer security.

At 606, the base station 604 may transmit a configuration of a secure downlink RS and/or a secure uplink RS for each CC of a set of CCs. The UE 602 may receive the configuration of the secure downlink RS and/or the configuration of the secure uplink RS for each CC of the set of CCs. The secure downlink RS and/or the secure uplink RS may be configured for CC switching to provide the physical layer security. In one aspect, the secure downlink RS may be a CSI-RS. In another aspect, the secure uplink RS may be an SRS. The set of secure RSs and the corresponding resources may be configured to follow the channel reciprocity so that the base station 604 and the UE 602 may select the same set of the subset of CCs. That is, the base station 604 may configure the set of secure RSs with the resources on the same BWP (UL/DL) and QCLed to sound the same channel.

In one aspect, the base station 604 may configure at least one RE of the set of secure RSs for the base station 604 and the UE 602, and the base station 604 and the UE 602 may select the subset of CCs based on at least one measurement of the set of secure RSs across the at least one RE. In another aspect, the base station 604 may configure a metric or a mapping function for the base station 604 and the UE 602 to apply to the measurement of the set of secure RSs across the at least one RE, and the base station 604 and the UE 602 may select the subset of CCs based on the outcome of the metric or the mapping function applied to the at least one measurement of the set of secure RSs across the at least one RE. For example, the metric or the mapping function may include a sum or an average of the measurement, e.g., RSRP, RSSI, eigenvalues, etc., of the channels (DL/UL) estimated based on the set of secure RSs across the at least one RE. In another aspect, the base station 604 may configure the base station 604 and the UE 602 to use the selected subset of CCs for the next L time units, e.g., transmissions, slots, or milliseconds (ms).

In some aspects, the base station 604 may transmit the configuration of the secure downlink RS and/or the secure uplink RS for each CC of a set of CCs via the RRC message, the MAC-CE, or the DCI. In one aspect, the base station 604 may configure the secure downlink RS and/or the secure uplink RS for each CC of a set of CCs via the RRC message, the MAC-CE, or the DCI. In another aspect, the base station 604 may configure multiple sets of the secure downlink RS and/or the secure uplink RS via the RRC message, and the base station 604 may transmit the MAC-CE or the DCI to activate/deactivate, select, switch, or change one secure downlink RS and/or one secure uplink RS. In another aspect, a default configuration may be configured for the base station 604 and the UE 602 in the absence of the configuration from the base station 604.

At 608, the base station 604 may transmit an instruction to select a subset of CCs from the set of CCs. The UE 602 may receive the instruction to select the subset of CCs from the set of CCs. In one aspect, the instruction to select the subset of CCs may be transmitted to the UE 602 via the MAC-CE or the DCI. In another aspect, the instruction to select the subset of CCs may include at least a part of the configuration of the secure downlink RS and/or the secure uplink RS for each CC of the set of CCs.

At 610, the UE 602 may transmit an ACK to the base station 604 in response to receiving the instruction to select the subset of CCs from the set of CCs at 608. The base station 604 may receive the ACK from the UE 602 in response to transmitting the instruction to select the subset of CCs from the set of CCs at 608. That is, the UE 602 may transmit the ACK to the base station 604 to signal that the instruction to select the subset of CCs from the set of CCs was successfully received, and the base station 604 may receive the ACK to confirm that the instruction to select the subset of CCs from the set of CCs was successfully transmitted to the UE 602.

At 611, the base station 604 may transmit the secure downlink RS in the set of CCs in response to transmitting the instruction to select the subset of CCs from the set of CCs at 608. That is, the base station 604 may transmit the secure downlink RS to the UE 602 in response to receiving the ACK 610 in response to transmitting the instruction to select the subset of CCs from the set of CCs. The UE 602 may receive the secure downlink RS in the set of CCs in response to receiving the instruction to select the subset of CCs from the set of CCs at 608. That is, the secure downlink RS may be received from the base station 604 in response to the ACK transmitted at 610 in response to receiving the instruction to select the subset of CCs from the set of CCs at 608.

At 612, the UE 602 may transmit, to the base station 604, the secure uplink RS in the set of CCs in response to receiving the instruction to select the subset of CCs from the set of CCs at 608. The base station 604 may receive, from the UE 602, the secure uplink RS in the set of CCs in response to transmitting the instruction to select the subset of CCs from the set of CCs at 608.

At 614, the UE 602 may measure the secure downlink RS in at least one RE in each CC of the set of CCs. The UE 602 may measure the secure downlink RS based on the configuration received at 606. The UE 602 may measure at least one RE of the secure downlink RS on the set of CCs and select the subset of CCs from the set of CCs based on the measurements of the set of secure RSs on the set of CCs across the at least one RE. For example, the base station 604 and the UE 602 may measure the RSRP, the RSSI, the eigenvalues, etc., of the at least one RE of the secure downlink RSs on the set of CCs.

At 616, the UE 602 may determine the subset of CCs based on the measured secure downlink RS in the at least one RE in each CC of the set of CCs. The UE 602 may select the subset of CCs from the set of CCs based on the configuration received at 606 and/or the instruction received at 608. The UE 602 may select the subset of CCs based on the outcome of the metric or the mapping function applied to the measurement of the secure downlink RSs on the set of CCs across the at least one RE. At 618, the base station 604 may measure the secure uplink RS in at least one RE in each CC of the set of CCs. The base station 604 may measure the secure uplink RS based on the configuration received at 606. The base station 604 may measure at least one RE of the uplink RS on the set of CCs and select the subset of CCs from the set of CCs based on the measurements of the secure uplink RS on the set of CCs across the at least one RE. For example, UE 602 and the base station 604 may measure the RSRP, the RSSI, the eigenvalue, etc., of the at least one RE of the secure uplink RS on the set of CCs.

At 620, the base station 604 may determine the subset of CCs based on the measured secure uplink RS in the at least one RE in each CC of the set of CCs. The base station 604 may select the subset of CCs from the set of CCs based on the configuration transmitted at 606 and/or the instruction transmitted at 608. The base station 604 may select the subset of CCs based on the outcome of the metric or the mapping function applied to the measurement of the secure uplink RSs on the set of CCs across the at least one RE.

At 622, the base station 604 and the UE 602 may communicate with each other on at least one CC of the determined subset of CCs. In some aspects, the determined subset of CCs may be used for communication for subsequent L time units, the time units corresponding with a number of transmissions, a number of slots, or milliseconds of time.

At 624, the base station 604 and the UE 602 may switch from the first CC to a second CC of the determined subset of CCs. In some aspects, the switching may be based on a number of ACKs and/or NACKs transmitted. In one aspect, the base station 604 and the UE 602 may switch the CC based on the number of the ACKs transmitted between the base station 604 and the UE 602 within a time window being smaller than a first threshold value. In another aspect, the base station 604 and the UE 602 may switch the CC based on the number of the NACKs transmitted between the base station 604 and the UE 602 being greater than or equal to a second threshold value. For example, L=K×M, K being the number of CCs in the subset of CCs, and to communicate with the base station 604, and switching may include switching through K CCs, after communicating with the base station 604 or M time unit in each CC of the K CCs.

Figure 7:
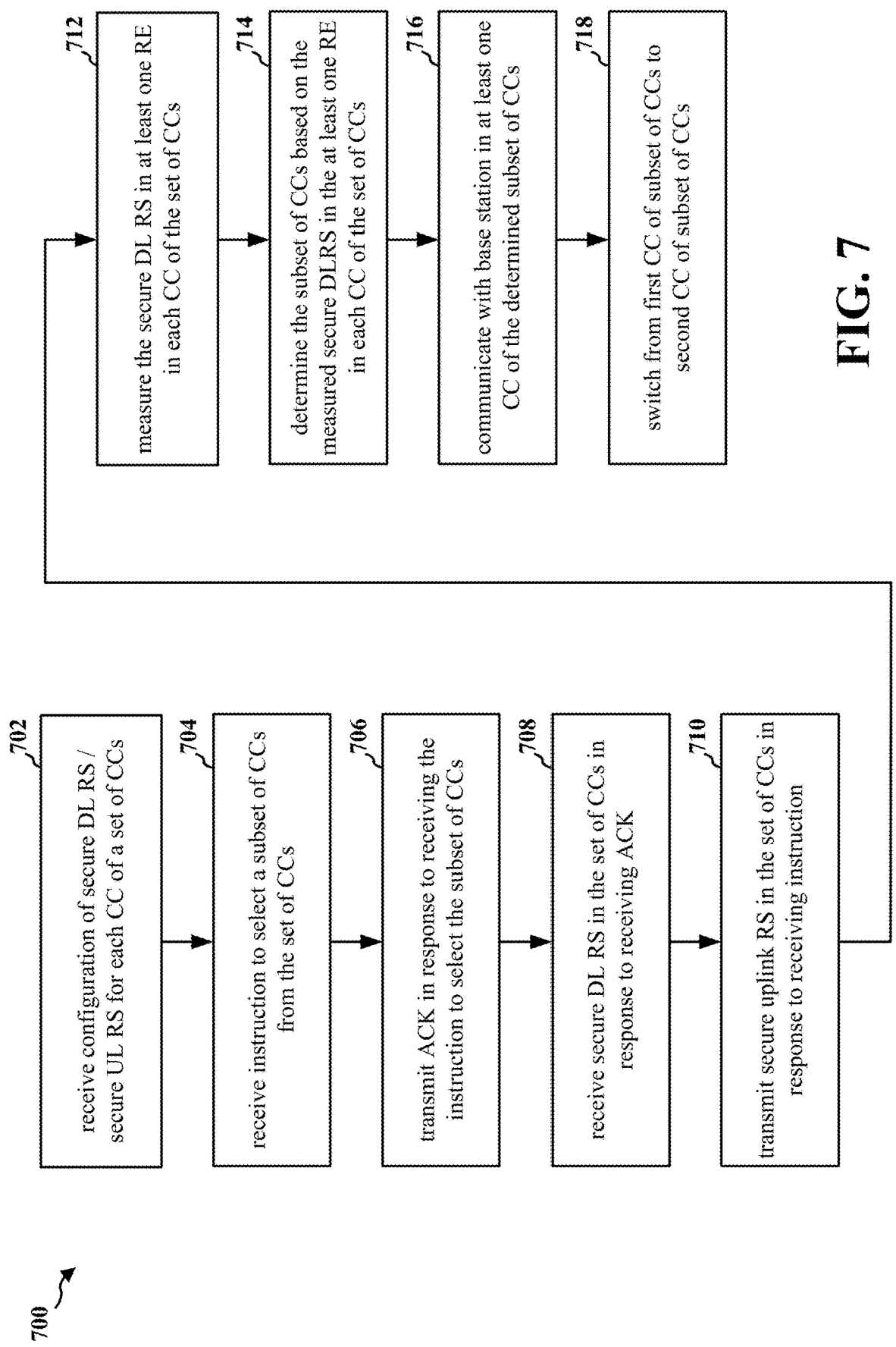
FIG. 7 is a flowchart of a method of wireless communication.

FIG. 7 is a flowchart 700 of a method of wireless communication. The method may be performed by a UE (e.g., the UE 104/402/602; the apparatus 1102). The UE may measure a secure downlink RS to select a subset of CCs among a set of CCs based on the measurement of the secure downlink RS and communicate with a base station on the subset of CCs.

At 702, the UE may receive, from the base station, a configuration of the secure downlink RS and/or the configuration of the secure uplink RS for each CC of the set of CCs. The secure downlink RS and/or the secure uplink RS may be configured for CC switching to provide the physical layer security. In one aspect, the secure downlink RS may be a CSI-RS. In another aspect, the secure uplink RS may be an SRS. The set of secure RSs and the corresponding resources may be configured to follow the channel reciprocity so that the base station and the UE may select the same set of the subset of CCs. That is, the base station may configure the set of secure RSs with the resources on the same BWP (UL/DL) and QCLed to sound the same channel. For example, at 606, the UE 602 may receive the configuration of the secure downlink RS and/or the configuration of the secure uplink RS for each CC of the set of CCs. Furthermore, 702 may be performed by a secure downlink RS/secure uplink RS component 1140.

In one aspect, the base station may configure at least one RE of the set of secure RSs for the base station and the UE, and the base station and the UE may select the subset of CCs based on at least one measurement of the set of secure RSs across the at least one RE. In another aspect, the base station may configure a metric or a mapping function for the base station and the UE to apply to the measurement of the set of secure RSs across the at least one RE, and the base station and the UE may select the subset of CCs based on the outcome of the metric or the mapping function applied to the at least one measurement of the set of secure RSs across the at least one RE. For example, the metric or the mapping function may include a sum or an average of the measurement, e.g., RSRP, RSSI, eigenvalues, etc., of the channels (DL/UL) estimated based on the set of secure RSs across the at least one RE. In another aspect, the base station may configure the base station and the UE to use the selected subset of CCs for the next L time units, e.g., transmissions, slots, or milliseconds (ms).

In some aspects, the base station may transmit the configuration of the secure downlink RS and/or the secure uplink RS for each CC of a set of CCs via the RRC message, the MAC-CE, or the DCI. In one aspect, the base station may configure the secure downlink RS and/or the secure uplink RS for each CC of a set of CCs via the RRC message, the MAC-CE, or the DCI. In another aspect, the base station may configure multiple sets of the secure downlink RS and/or the secure uplink RS via the RRC message, and the base station may transmit the MAC-CE or the DCI to activate/deactivate, select, switch, or change one secure downlink RS and/or one secure uplink RS. In another aspect, a default configuration may be configured for the base station and the UE in the absence of the configuration from the base station.

At 704, the UE may receive, from the base station, an instruction to select the subset of CCs from the set of CCs. In one aspect, the instruction to select the subset of CCs may be received from the base station via the MAC-CE or the DCI. In another aspect, the instruction to select the subset of CCs may include at least a part of the configuration of the secure downlink RS and/or the secure uplink RS for each CC of the set of CCs. For example, at 608, the UE 602 may receive the instruction to select the subset of CCs from the set of CCs. Furthermore, 704 may be performed by a CC selection component 1142.

At 706, the UE may transmit an ACK to the base station in response to receiving the instruction to select the subset of CCs from the set of CCs at 704. That is, the UE may transmit the ACK to the base station to signal that the instruction to select the subset of CCs from the set of CCs was successfully received. For example, at 610, the UE 602 may transmit an ACK to the base station 604 in response to receiving the instruction to select the subset of CCs from the set of CCs at 608. Furthermore, 706 may be performed by an ACK component 1144.

At 708, the UE may receive the secure downlink RS in the set of CCs in response to receiving the instruction to select the subset of CCs from the set of CCs at 704. That is, the secure downlink RS may be received from the base station in response to the ACK transmitted at 706 in response to receiving the instruction to select the subset of CCs from the set of CCs at 704. For example, at 611, the UE 602 may receive the secure downlink RS in the set of CCs in response to receiving the instruction to select the subset of CCs from the set of CCs at 608. Furthermore, 708 may be performed by the secure downlink RS/secure uplink RS component 1140.

At 710, the UE may transmit, to the base station, the secure uplink RS in the set of CCs in response to receiving the instruction to select the subset of CCs from the set of CCs at 704. For example, at 612, the UE 602 may transmit, to the base station 604, the secure uplink RS in the set of CCs in response to receiving the instruction to select the subset of CCs from the set of CCs at 608. Furthermore, 710 may be performed by the secure downlink RS/secure uplink RS component 1140.

At 712, the UE may measure the secure downlink RS in at least one RE in each CC of the set of CCs. The UE may measure at least one RE of the secure downlink RS on the set of CCs and select the subset of CCs from the set of CCs based on the measurements of the set of secure RSs on the set of CCs across the at least one RE. For example, the base station and the UE may measure the RSRP, the RSSI, the eigenvalues, etc., of the at least one RE of the secure downlink RSs on the set of CCs. For example, at 614, the UE 602 may measure the secure downlink RS in at least one RE in each CC of the set of CCs. Furthermore, 712 may be performed by the secure downlink RS/secure uplink RS component 1140.

At 714, the UE may determine the subset of CCs based on the measured secure downlink RS in the at least one RE in each CC of the set of CCs. The UE may select the subset of CCs from the set of CCs based on the configuration received at 702 and/or the instruction received at 704. The UE may select the subset of CCs based on the outcome of the metric or the mapping function applied to the measurement of the secure downlink RSs on the set of CCs across the at least one RE. For example, at 616, the UE 602 may determine the subset of CCs based on the measured secure downlink RS in the at least one RE in each CC of the set of CCs. Furthermore, 714 may be performed by a CC selection component 1142.

At 716, the UE may communicate with the base station on at least one CC of the determined subset of CCs. In some aspects, the determined subset of CCs may be used for communication for subsequent L time units, the time units corresponding with a number of transmissions, a number of slots, or milliseconds of time. For example, at 622, the base station 604 and the UE 602 may communicate with each other on at least one CC of the determined subset of CCs. Furthermore, 716 may be performed by a CC switching component 1146.

At 718, the UE may switch from a first CC to a second CC of the determined subset of CCs. In some aspects, the switching may be based on a number of ACKs and/or NACKs transmitted. In one aspect, the base station and the UE may switch the CC based on the number of the ACKs transmitted between the base station and the UE within a time window being smaller than a first threshold value. In another aspect, the base station and the UE may switch the CC based on the number of the NACKs transmitted between the base station and the UE being greater than or equal to a second threshold value. For example, L=K×M, K being the number of CCs in the subset of CCs, and to communicate with the base station, and switching may include switching through K CCs, after communicating with the base station for M time unit in each CC of the K CCs. For example, at 624, the base station 604 and the UE 602 may switch from the first CC to the second CC of the determined subset of CCs. Furthermore, 718 may be performed by the CC switching component 1146.

Figure 8:
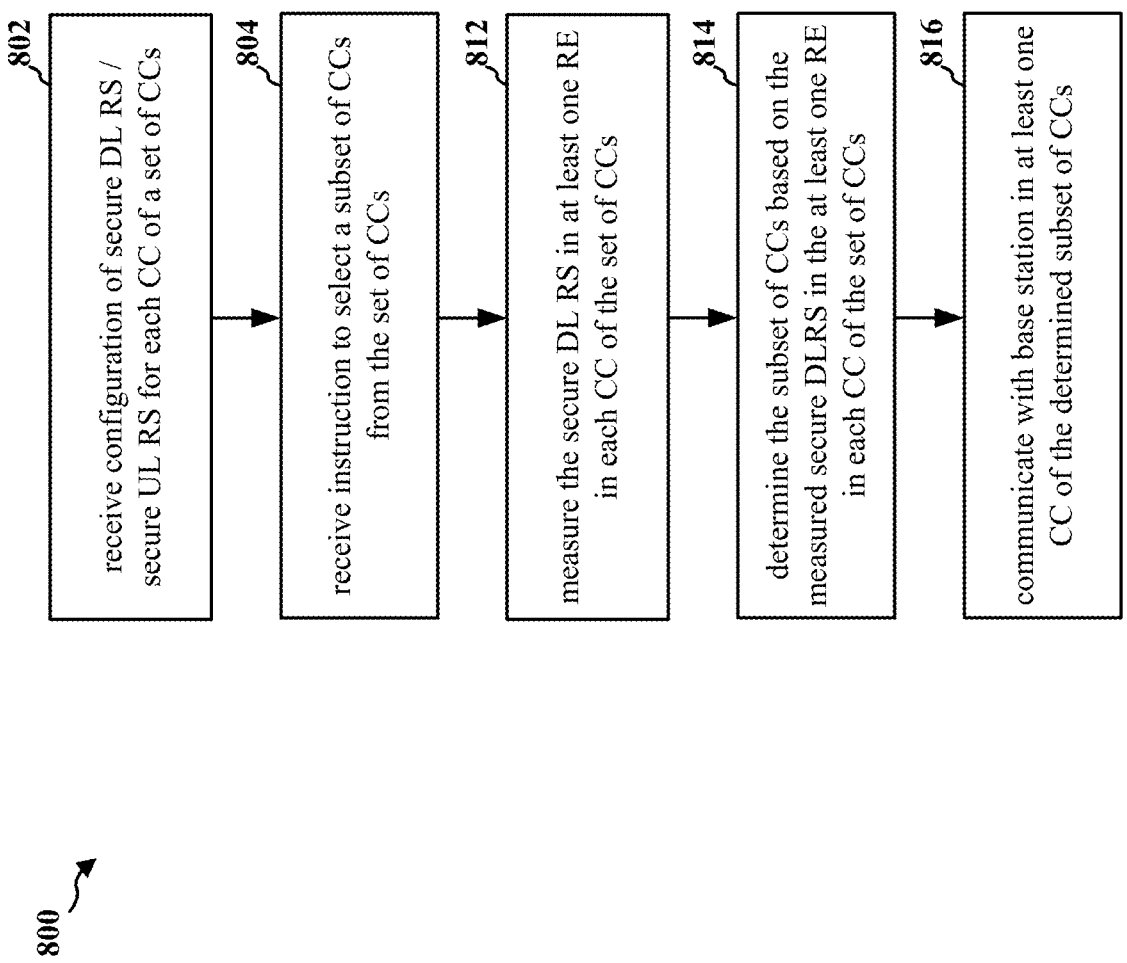
FIG. 8 is a flowchart of a method of wireless communication.

FIG. 8 is a flowchart 800 of a method of wireless communication. The method may be performed by a UE (e.g., the UE 104/402/602; the apparatus 1102). The UE may measure a secure downlink RS to select a subset of CCs among a set of CCs based on the measurement of the secure downlink RS and communicate with a base station on the subset of CCs.

At 802, the UE may receive, from the base station, a configuration of the secure downlink RS and/or the configuration of the secure uplink RS for each CC of the set of CCs. The secure downlink RS and/or the secure uplink RS may be configured for CC switching to provide the physical layer security. In one aspect, the secure downlink RS may be a CSI-RS. In another aspect, the secure uplink RS may be an SRS. The set of secure RSs and the corresponding resources may be configured to follow the channel reciprocity so that the base station and the UE may select the same set of the subset of CCs. That is, the base station may configure the set of secure RSs with the resources on the same BWP (UL/DL) and QCLed to sound the same channel. For example, at 606, the UE 602 may receive the configuration of the secure downlink RS and/or the configuration of the secure uplink RS for each CC of the set of CCs. Furthermore, 802 may be performed by a secure downlink RS/secure uplink RS component 1140.

In one aspect, the base station may configure at least one RE of the set of secure RSs for the base station and the UE, and the base station and the UE may select the subset of CCs based on at least one measurement of the set of secure RSs across the at least one RE. In another aspect, the base station may configure a metric or a mapping function for the base station and the UE to apply to the measurement of the set of secure RSs across the at least one RE, and the base station and the UE may select the subset of CCs based on the outcome of the metric or the mapping function applied to the at least one measurement of the set of secure RSs across the at least one RE. For example, the metric or the mapping function may include a sum or an average of the measurement, e.g., RSRP, RSSI, eigenvalues, etc., of the channels (DL/UL) estimated based on the set of secure RSs across the at least one RE. In another aspect, the base station may configure the base station and the UE to use the selected subset of CCs for the next L time units, e.g., transmissions, slots, or milliseconds (ms).

In some aspects, the base station may transmit the configuration of the secure downlink RS and/or the secure uplink RS for each CC of a set of CCs via the RRC message, the MAC-CE, or the DCI. In one aspect, the base station may configure the secure downlink RS and/or the secure uplink RS for each CC of a set of CCs via the RRC message, the MAC-CE, or the DCI. In another aspect, the base station may configure multiple sets of the secure downlink RS and/or the secure uplink RS via the RRC message, and the base station may transmit the MAC-CE or the DCI to activate/deactivate, select, switch, or change one secure downlink RS and/or one secure uplink RS. In another aspect, a default configuration may be configured for the base station and the UE in the absence of the configuration from the base station.

At 804, the UE may receive, from the base station, an instruction to select the subset of CCs from the set of CCs. In one aspect, the instruction to select the subset of CCs may be received from the base station via the MAC-CE or the DCI. In another aspect, the instruction to select the subset of CCs may include at least a part of the configuration of the secure downlink RS and/or the secure uplink RS for each CC of the set of CCs. For example, at 608, the UE 602 may receive the instruction to select the subset of CCs from the set of CCs. Furthermore, 804 may be performed by a CC selection component 1142.

At 812, the UE may measure the secure downlink RS in at least one RE in each CC of the set of CCs. The UE may measure at least one RE of the secure downlink RS on the set of CCs and select the subset of CCs from the set of CCs based on the measurements of the set of secure RSs on the set of CCs across the at least one RE. For example, the base station and the UE may measure the RSRP, the RSSI, the eigenvalues, etc., of the at least one RE of the secure downlink RSs on the set of CCs. For example, at 614, the UE 602 may measure the secure downlink RS in at least one RE in each CC of the set of CCs. Furthermore, 812 may be performed by the secure downlink RS/secure uplink RS component 1140.

At 814, the UE may determine the subset of CCs based on the measured secure downlink RS in the at least one RE in each CC of the set of CCs. The UE may select the subset of CCs from the set of CCs based on the configuration received at 802 and/or the instruction received at 804. The UE may select the subset of CCs based on the outcome of the metric or the mapping function applied to the measurement of the secure downlink RSs on the set of CCs across the at least one RE. For example, at 616, the UE 602 may determine the subset of CCs based on the measured secure downlink RS in the at least one RE in each CC of the set of CCs. Furthermore, 814 may be performed by a CC selection component 1142.

At 816, the UE may communicate with the base station on at least one CC of the determined subset of CCs. In some aspects, the determined subset of CCs may be used for communication for subsequent L time units, the time units corresponding with a number of transmissions, a number of slots, or milliseconds of time. For example, at 622, the base station 604 and the UE 602 may communicate with each other on at least one CC of the determined subset of CCs. Furthermore, 816 may be performed by a CC switching component 1146.

Figure 9:
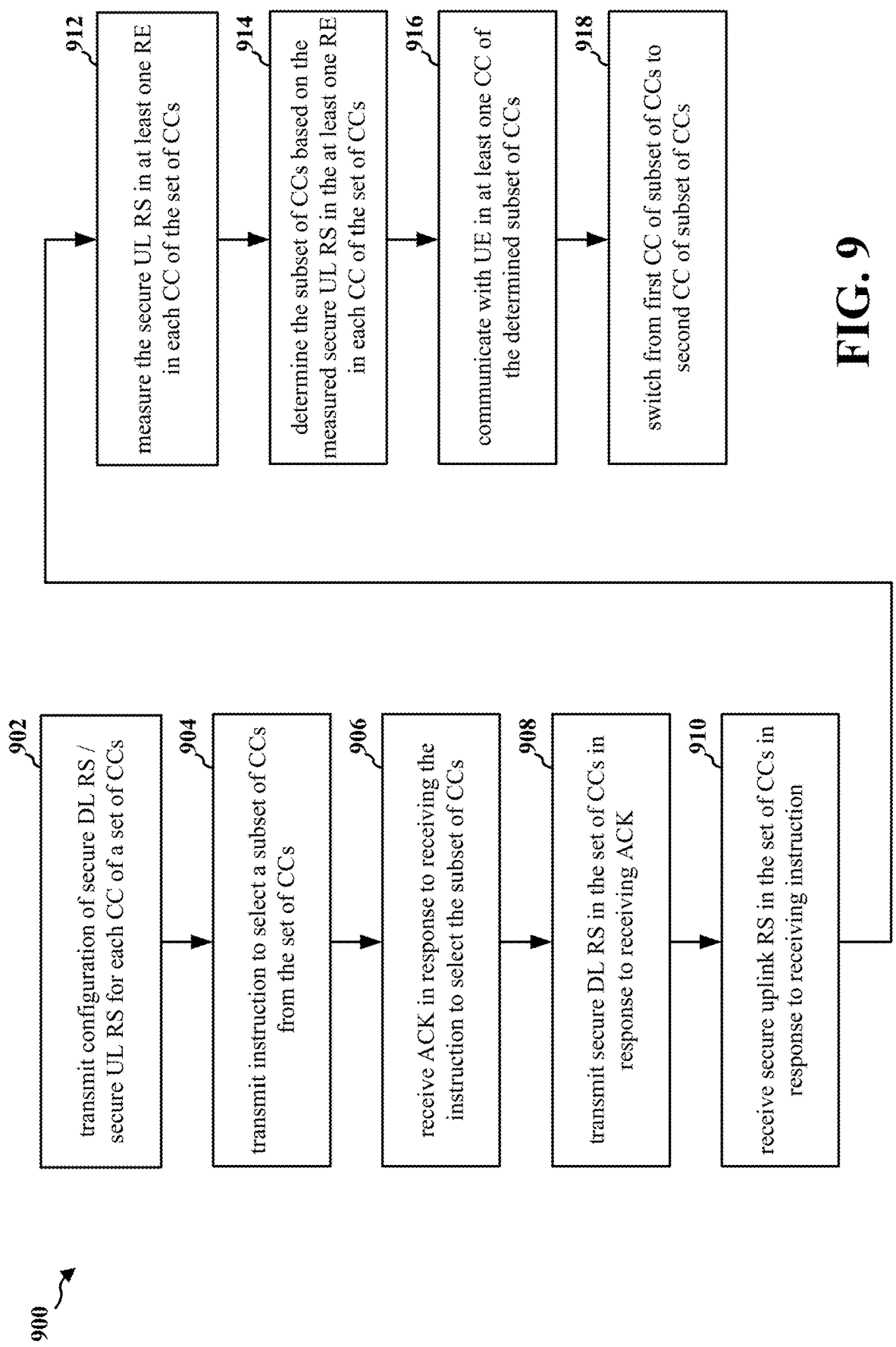
FIG. 9 is a flowchart of a method of wireless communication.

FIG. 9 is a flowchart 900 of a method of wireless communication. The method may be performed by a base station (e.g., the base station 102/180/404/604; the apparatus 1202). The base station may measure a secure uplink RS to select a subset of CCs among a set of CCs based on the measurement of the secure uplink RS, and communicate with a UE on the subset of CCs.

At 902, the base station may transmit a configuration of a secure downlink RS and/or a secure uplink RS for each CC of a set of CCs. The secure downlink RS and/or the secure uplink RS may be configured for CC switching to provide the physical layer security. In one aspect, the secure downlink RS may be a CSI-RS. In another aspect, the secure uplink RS may be an SRS. The set of secure RSs and the corresponding resources may be configured to follow the channel reciprocity so that the base station and the UE may select the same set of the subset of CCs. That is, the base station may configure the set of secure RSs with the resources on the same BWP (UL/DL) and QCLed to sound the same channel. For example, at 606, the base station 604 may transmit a configuration of a secure downlink RS and/or a secure uplink RS for each CC of a set of CCs. Furthermore, 902 may be performed by a secure downlink RS/secure uplink RS component 1240.

In one aspect, the base station may configure at least one RE of the set of secure RSs for the base station and the UE, and the base station and the UE may select the subset of CCs based on at least one measurement of the set of secure RSs across the at least one RE. In another aspect, the base station may configure a metric or a mapping function for the base station and the UE to apply to the measurement of the set of secure RSs across the at least one RE, and the base station and the UE may select the subset of CCs based on the outcome of the metric or the mapping function applied to the at least one measurement of the set of secure RSs across the at least one RE. For example, the metric or the mapping function may include a sum or an average of the measurement, e.g., RSRP, RSSI, eigenvalues, etc., of the channels (DL/UL) estimated based on the set of secure RSs across the at least one RE. In another aspect, the base station may configure the base station and the UE to use the selected subset of CCs for the next L time units, e.g., transmissions, slots, or milliseconds (ms).

In some aspects, the base station may transmit the configuration of the secure downlink RS and/or the secure uplink RS for each CC of a set of CCs via the RRC message, the MAC-CE, or the DCI. In one aspect, the base station may configure the secure downlink RS and/or the secure uplink RS for each CC of a set of CCs via the RRC message, the MAC-CE, or the DCI. In another aspect, the base station may configure multiple sets of the secure downlink RS and/or the secure uplink RS via the RRC message, and the base station may transmit the MAC-CE or the DCI to activate/deactivate, select, switch, or change one secure downlink RS and/or one secure uplink RS. In another aspect, a default configuration may be configured for the base station and the UE in the absence of the configuration from the base station.

At 904, the base station may transmit an instruction to select a subset of CCs from the set of CCs. In one aspect, the instruction to select the subset of CCs may be received from the base station via the MAC-CE or the DCI. In another aspect, the instruction to select the subset of CCs may include at least a part of the configuration of the secure downlink RS and/or the secure uplink RS for each CC of the set of CCs. For example, at 608, the base station 604 may transmit an instruction to select a subset of CCs from the set of CCs. Furthermore, 904 may be performed by a CC selection component 1242.

At 906, the base station may receive the ACK from the UE in response to transmitting the instruction to select the subset of CCs from the set of CCs at 904. That is, the base station may receive the ACK to confirm that the instruction to select the subset of CCs from the set of CCs was successfully transmitted to the UE. For example, at 610, the base station 604 may receive the ACK from the UE 602 in response to transmitting the instruction to select the subset of CCs from the set of CCs at 608. Furthermore, 906 may be performed by an ACK component 1244.

At 908, the base station may transmit the secure downlink RS in the set of CCs in response to transmitting the instruction to select the subset of CCs from the set of CCs at 904. That is, the secure downlink RS may be transmitted to the UE in response to receiving the ACK from the UE at 906 in response to transmitting the instruction to select the subset of CCs from the set of CCs at 904. For example, at 611, the base station 604 may transmit the secure downlink RS in the set of CCs in response to transmitting the instruction to select the subset of CCs from the set of CCs at 608. Furthermore, 908 may be performed by the secure downlink RS/secure uplink RS component 1240.

At 910, the base station may receive, from the UE, the secure uplink RS in the set of CCs in response to transmitting the instruction to select the subset of CCs from the set of CCs at 904. For example, at 612, the base station 604 may receive, from the UE 602, the secure uplink RS in the set of CCs in response to transmitting the instruction to select the subset of CCs from the set of CCs at 608. Furthermore, 910 may be performed by the secure downlink RS/secure uplink RS component 1240.

At 912, the base station may measure the secure uplink RS in at least one RE in each CC of the set of CCs. The base station may measure the secure uplink RS based on the configuration received at 702. The base station may measure at least one RE of the uplink RS on the set of CCs and select the subset of CCs from the set of CCs based on the measurements of the secure uplink RS on the set of CCs across the at least one RE. For example, the base station may measure the RSRP, the RSSI, the eigenvalue, etc., of the at least one RE of the secure uplink RS on the set of CCs. For example, at 618, the base station 604 may measure the secure uplink RS in at least one RE in each CC of the set of CCs. Furthermore, 912 may be performed by the secure downlink RS/secure uplink RS component 1240.

At 914, the base station may determine the subset of CCs based on the measured secure uplink RS in the at least one RE in each CC of the set of CCs. The base station may select the subset of CCs from the set of CCs based on the configuration transmitted at 902 and/or the instruction transmitted at 904. The base station may select the subset of CCs based on the outcome of the metric or the mapping function applied to the measurement of the secure uplink RSs on the set of CCs across the at least one RE. For example, at 620, the base station 604 may determine the subset of CCs based on the measured secure uplink RS in the at least one RE in each CC of the set of CCs. Furthermore, 914 may be performed by the CC selection component 1242.

At 916, the base station may communicate with the UE on at least one CC of the determined subset of CCs. In some aspects, the determined subset of CCs may be used for communication for subsequent L time units, the time units corresponding with a number of transmissions, a number of slots, or milliseconds of time. For example, at 622, the base station 604 and the UE 602 may communicate with each other on at least one CC of the determined subset of CCs. For example, at 622, the base station 604 and the UE 602 may communicate with each other on at least one CC of the determined subset of CCs. Furthermore, 916 may be performed by a CC switching component 1246.

At 918, the base station may switch from a first CC to a second CC of the determined subset of CCs. In some aspects, the switching may be based on a number of ACKs and/or NACKs transmitted. In one aspect, the base station and the UE may switch the CC based on the number of the ACKs transmitted between the base station and the UE within a time window being smaller than a first threshold value. In another aspect, the base station and the UE may switch the CC based on the number of the NACKs transmitted between the base station and the UE being greater than or equal to a second threshold value. For example, L=K×M, K being the number of CCs in the subset of CCs, and to communicate with the base station, and switching may include switching through K CCs, after communicating with the base station for M time unit in each CC of the K CCs. For example, at 624, the base station 604 and the UE 602 may switch from the first CC to the second CC of the determined subset of CCs. Furthermore, 918 may be performed by the CC switching component 1246.

Figure 10:
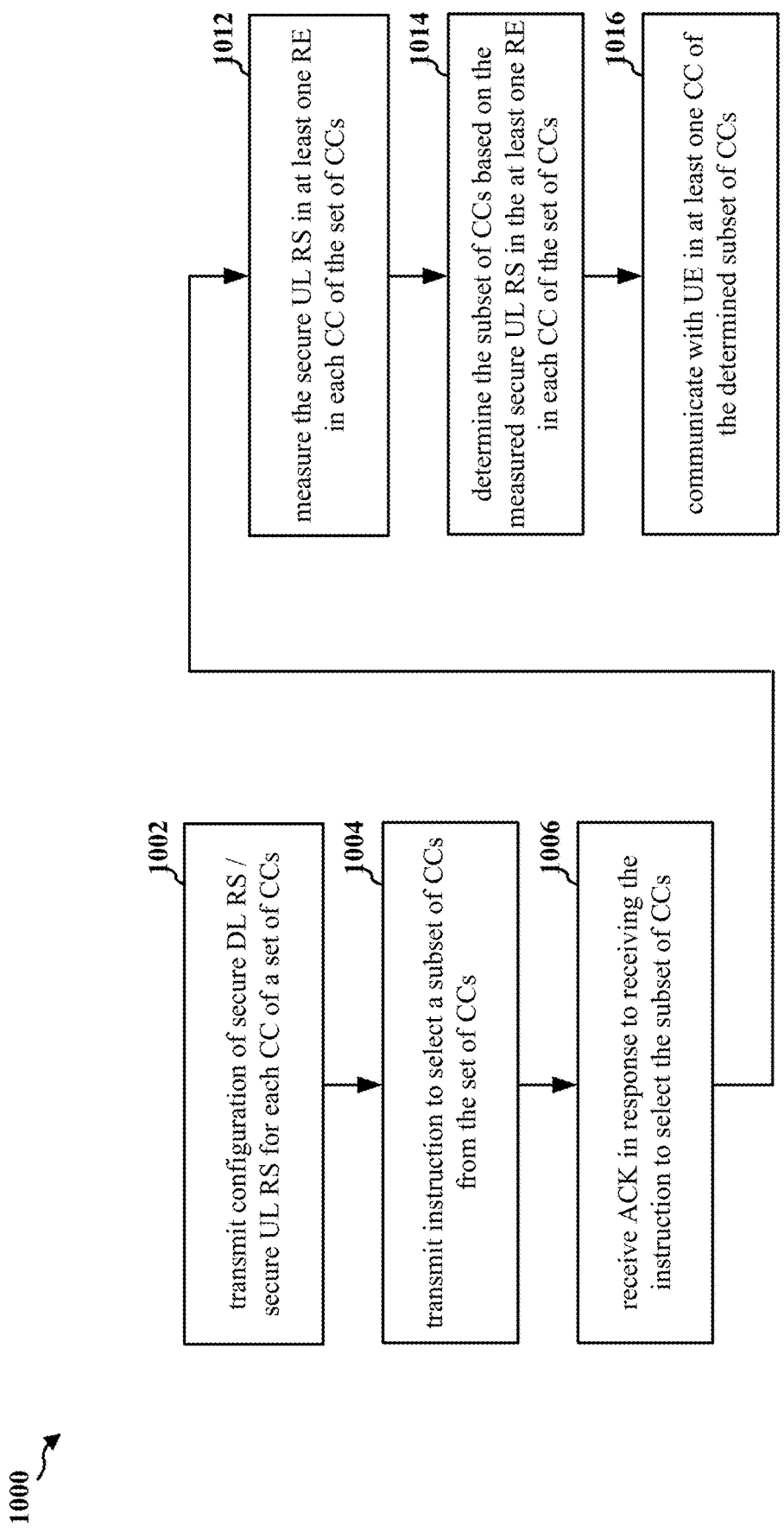
FIG. 10 is a flowchart of a method of wireless communication.

FIG. 10 is a flowchart 1000 of a method of wireless communication. The method may be performed by a base station (e.g., the base station 102/180/404/604; the apparatus 1202). The base station may measure a secure uplink RS to select a subset of CCs among a set of CCs based on the measurement of the secure uplink RS and communicate with a UE on the subset of CCs.

At 1002, the base station may transmit a configuration of a secure downlink RS and/or a secure uplink RS for each CC of a set of CCs. The secure downlink RS and/or the secure uplink RS may be configured for CC switching to provide the physical layer security. In one aspect, the secure downlink RS may be a CSI-RS. In another aspect, the secure uplink RS may be an SRS. The set of secure RSs and the corresponding resources may be configured to follow the channel reciprocity so that the base station and the UE may select the same set of the subset of CCs. That is, the base station may configure the set of secure RSs with the resources on the same BWP (UL/DL) and QCLed to sound the same channel. For example, at 606, the base station 604 may transmit a configuration of a secure downlink RS and/or a secure uplink RS for each CC of a set of CCs. Furthermore, 1002 may be performed by a secure downlink RS/secure uplink RS component 1240.

In one aspect, the base station may configure at least one RE of the set of secure RSs for the base station and the UE, and the base station and the UE may select the subset of CCs based on at least one measurement of the set of secure RSs across the at least one RE. In another aspect, the base station may configure a metric or a mapping function for the base station and the UE to apply to the measurement of the set of secure RSs across the at least one RE, and the base station and the UE may select the subset of CCs based on the outcome of the metric or the mapping function applied to the at least one measurement of the set of secure RSs across the at least one RE. For example, the metric or the mapping function may include a sum or an average of the measurement, e.g., RSRP, RSSI, eigenvalues, etc., of the channels (DL/UL) estimated based on the set of secure RSs across the at least one RE. In another aspect, the base station may configure the base station and the UE to use the selected subset of CCs for the next L time units, e.g., transmissions, slots, or milliseconds (ms).

In some aspects, the base station may transmit the configuration of the secure downlink RS and/or the secure uplink RS for each CC of a set of CCs via the RRC message, the MAC-CE, or the DCI. In one aspect, the base station may configure the secure downlink RS and/or the secure uplink RS for each CC of a set of CCs via the RRC message, the MAC-CE, or the DCI. In another aspect, the base station may configure multiple sets of the secure downlink RS and/or the secure uplink RS via the RRC message, and the base station may transmit the MAC-CE or the DCI to activate/deactivate, select, switch, or change one secure downlink RS and/or one secure uplink RS. In another aspect, a default configuration may be configured for the base station and the UE in the absence of the configuration from the base station.

At 1004, the base station may transmit an instruction to select a subset of CCs from the set of CCs. In one aspect, the instruction to select the subset of CCs may be received from the base station via the MAC-CE or the DCI. In another aspect, the instruction to select the subset of CCs may include at least a part of the configuration of the secure downlink RS and/or the secure uplink RS for each CC of the set of CCs. For example, at 608, the base station 604 may transmit an instruction to select a subset of CCs from the set of CCs. Furthermore, 1004 may be performed by a CC selection component 1242.

At 1006, the base station may receive the ACK from the UE in response to transmitting the instruction to select the subset of CCs from the set of CCs at 1004. That is, the base station may receive the ACK to confirm that the instruction to select the subset of CCs from the set of CCs was successfully transmitted to the UE. For example, at 610, the base station 604 may receive the ACK from the UE 602 in response to transmitting the instruction to select the subset of CCs from the set of CCs at 608. Furthermore, 1006 may be performed by an ACK component 1244.

At 1012, the base station may measure the secure uplink RS in at least one RE in each CC of the set of CCs. The base station may measure the secure uplink RS based on the configuration received at 702. The base station may measure at least one RE of the uplink RS on the set of CCs and select the subset of CCs from the set of CCs based on the measurements of the secure uplink RS on the set of CCs across the at least one RE. For example, the base station may measure the RSRP, the RSSI, the eigenvalue, etc., of the at least one RE of the secure uplink RS on the set of CCs. For example, at 618, the base station 604 may measure the secure uplink RS in at least one RE in each CC of the set of CCs. Furthermore, 1012 may be performed by the secure downlink RS/secure uplink RS component 1240.

At 1014, the base station may determine the subset of CCs based on the measured secure uplink RS in the at least one RE in each CC of the set of CCs. The base station may select the subset of CCs from the set of CCs based on the configuration transmitted at 1002 and/or the instruction transmitted at 1004. The base station may select the subset of CCs based on the outcome of the metric or the mapping function applied to the measurement of the secure uplink RSs on the set of CCs across the at least one RE. For example, at 620, the base station 604 may determine the subset of CCs based on the measured secure uplink RS in the at least one RE in each CC of the set of CCs. Furthermore, 1014 may be performed by the CC selection component 1242.

At 1016, the base station may communicate with the UE on at least one CC of the determined subset of CCs. In some aspects, the determined subset of CCs may be used for communication for subsequent L time units, the time units corresponding with a number of transmissions, a number of slots, or milliseconds of time. For example, at 622, the base station 604 and the UE 602 may communicate with each other on at least one CC of the determined subset of CCs. For example, at 622, the base station 604 and the UE 602 may communicate with each other on at least one CC of the determined subset of CCs. Furthermore, 1016 may be performed by a CC switching component 1246.

Figure 11:
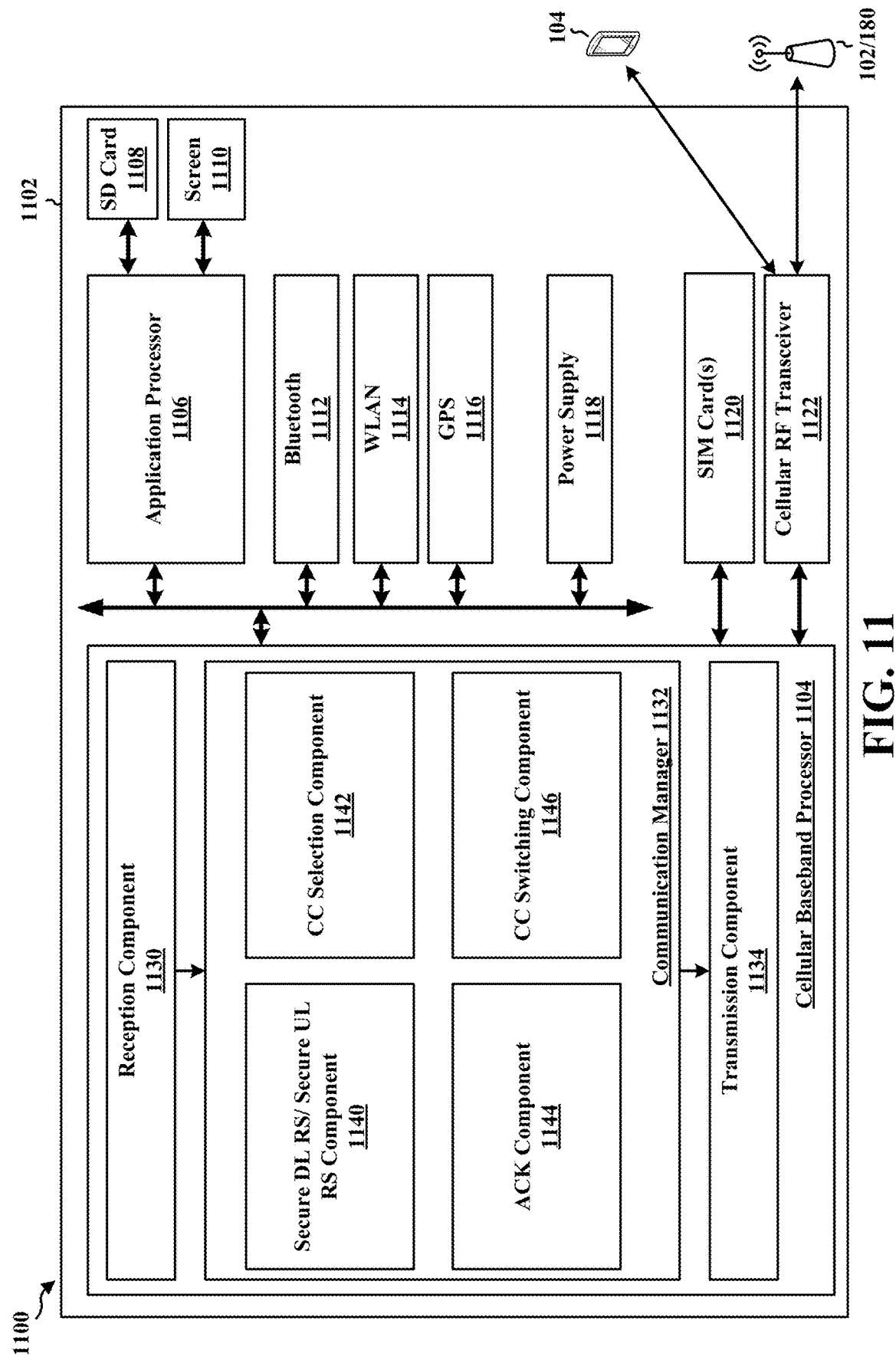
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1002 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 114 and/or station 102/180. The cellular baseband processor 1104 may include a computer-base readable medium / memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the cellular baseband processor 1104, and in another configuration, the apparatus 1102 may be the entire UE (e.g., see 350 of FIG. 3) and include the additional modules of the apparatus 1102.

The communication manager 1132 includes a secure downlink RS/secure uplink RS component 1140 that is configured to receive a configuration of the secure downlink RS and/or the configuration of the secure uplink RS for each CC of the set of CCs, receive the secure downlink RS in the set of CCs in response to receiving the instruction to select the subset of CCs from the set of CCs, transmit the secure uplink RS in the set of CCs in response to receiving the instruction to select the subset of CCs from the set of CCs, and measure the secure downlink RS in at least one RE in each CC of the set of CCs, e.g., as described in connection with 702, 708, 710, 712, 802, and 812. The communication manager 1132 further includes a CC selection component 1142 that is configured to receive an instruction to select the subset of CCs from the set of CCs, and determine the subset of CCs based on the measured secure downlink RS in the at least one RE in each CC of the set of CCs, e.g., as described in connection with 704, 714, 804, and 814. The communication manager 1132 further includes an ACK component 1144 that is configured to transmit an ACK to the base station in response to receiving the instruction to select the subset of CCs from the set of CCs, e.g., as described in connection with 706. The communication manager 1132 further includes a CC switching component 1146 that is configured to communicate with the base station on at least one CC of the determined subset of CCs, and switch from a first CC to a second CC of the determined subset of CCs, e.g., as described in connection with 716, 718, and 816.

The apparatus may include additional components that perform each of the blocks of the algorithm in the flowcharts of FIGS. 6, 7, and 8. As such, each block in the flowcharts of FIGS. 6, 7, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof As shown, the apparatus 1102 may include a variety of components configured for various functions. In one configuration, the apparatus 1102, and in particular the cellular baseband processor 1104, includes means for receiving, from a base station, a configuration of a secure downlink reference signal for each CC of a set of CCs, means for receiving an instruction to select a subset of CCs from the set of CCs, means for measuring the secure downlink RS in at least one RE in each CC of the set of CCs, means for determining the subset of CCs based on the measured secure downlink RS in the at least one RE in each CC of the set of CCs, and means for communicating with the base station on at least one CC of the determined subset of CCs. The apparatus 1102 includes means for transmitting an ACK to the base station in response to receiving the instruction to select the subset of CCs from the set of CCs, and means for transmitting the secure uplink RS in the set of CCs in response to receiving the instruction to select the subset of CCs from the set of CCs. The apparatus 1102 includes means for communicating with the base station in a first CC of the determined subset of CCs, means for switching from the first CC to a second CC of the determined subset of CCs to communicate with the base station, and means for switching through K CCs, after communicating with the base station for M time unit in each of the K CCs. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
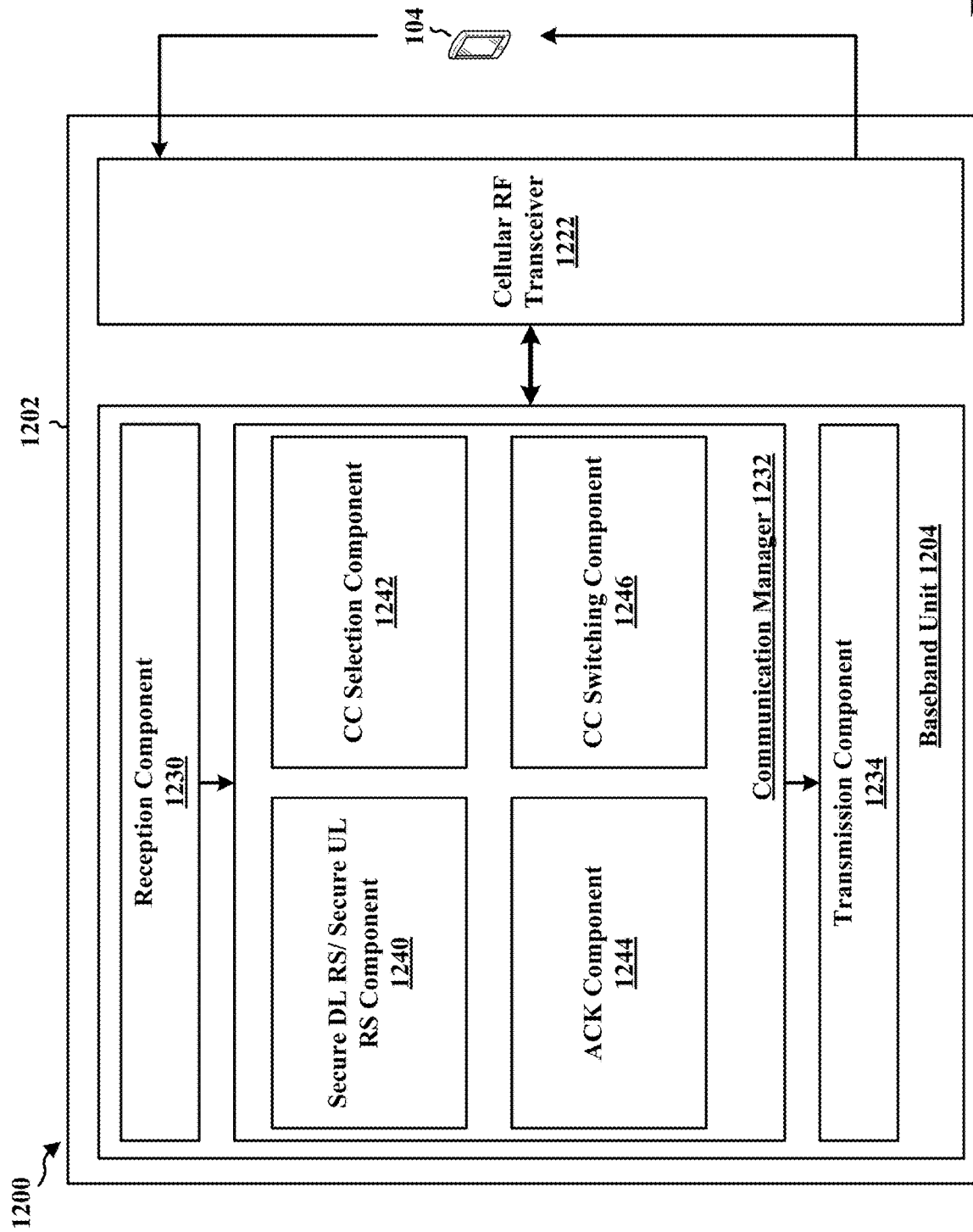
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1002 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a secure downlink RS/secure uplink RS component 1240 that is configured to transmit a configuration of a secure downlink RS and/or a secure uplink RS for each CC of a set of CCs, transmit the secure downlink RS in the set of CCs in response to transmitting the instruction to select the subset of CCs from the set of CCs, and receive the secure uplink RS in the set of CCs in response to transmitting the instruction to select the subset of CCs from the set of CCs, measure the secure uplink RS in at least one RE in each CC of the set of CCs, e.g., as described in connection with 902, 908, 910, 912, 1002, and 1012. The communication manager 1232 further includes a CC selection component 1242 that is configured to transmit an instruction to select a subset of CCs from the set of CCs, and determine the subset of CCs based on the measured secure uplink RS in the at least one RE in each CC of the set of CCs, e.g., as described in connection with 904, 914, 1004, and 1014. The communication manager 1232 further includes an ACK component 1244 that is configured to receive the ACK from the UE in response to transmitting the instruction to select the subset of CCs from the set of CCs, e.g., as described in connection with 906 and 1006. The communication manager 1232 further includes a CC switching component 1246 that is configured to communicate with the UE on at least one CC of the determined subset of CCs, and switch from a first CC to a second CC of the determined subset of CCs, e.g., as described in connection with 916, 918, and 1016.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for transmitting, to a UE, a configuration of a secure uplink reference signal for each CC of a set of CCs, means for transmitting, an instruction to select a subset of CCs from a set of CCs, means for receiving an ACK from the UE in response to transmitting the instruction to select the subset of CCs from the set of CCs, means for measuring the secure uplink RS in at least one RE in each CC of the set of CCs, means for determining the subset of CCs based on the measured secure uplink RS in the at least one RE in each CC of the set of CCs, and means for communicating with the UE on at least one CC of the determined subset of CCs. The apparatus 1102 includes means for transmitting, to the UE, the secure downlink RS in the set of CCs in response to transmitting the instruction to select the subset of CCs from the set of CCs. The apparatus 1102 includes communicate with the UE in a first CC of the determined subset of CCs, means for switching from the first CC to a second CC of the determined subset of CCs to communicate with the UE, and means for switching through K CCs, after communicating with the UE for M time unit in each of the K CCs. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

A base station may transmit, to a UE, a configuration of a secure uplink RS and a secure downlink RS for each CC of a set of CCs and at least one RE, and instruct the UE to select a subset of CCs from a set of CCs. The base station may measure the secure uplink RS received from the UE across the at least one RE, and select the subset of CCs from the set of CCs based on the measurement. The UE may measure the secure downlink RS received from the base station across the at least one RE, and select the subset of CCs from the set of CCs based on the measurement. Also, the base station and the UE may apply a metric or a mapping function to the measurement to select the subset of CCs.

The base station and the UE may communicate with each other on the subset of CCs. The base station and the UE may communicate with each other on a first CC of the subset of CCs, and switch the CC from the first CC to a second CC of the subset of CCs to communicate with each other. The switching of the CC may be based on a number of ACKs/NACKs transmitted between the base station and the UE or a pattern.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory, the at least one processor and the memory configured to receive, from a base station, a configuration of a secure downlink reference signal for each CC of a set of CCs, receive an instruction to select a subset of CCs from the set of CCs, measure the secure downlink RS in at least one RE in each CC of the set of CCs, determine the subset of CCs based on the measured secure downlink RS in the at least one RE in each CC of the set of CCs, and communicate with the base station on at least one CC of the determined subset of CCs.

Aspect 2 is the apparatus of aspect 1, where the at least one processor and the memory are further configured to transmit an ACK to the base station in response to receiving the instruction to select the subset of CCs from the set of CCs.

Aspect 3 is the apparatus of any of aspects 1 and 2, where the secure downlink RS is a secure CSI-RS.

Aspect 4 is the apparatus of any of aspects 1 to 3, where the configuration of the secure downlink RS further includes a configuration of a secure uplink RS, and the at least one processor and the memory are further configured to transmit, to the base station, the secure uplink RS in the set of CCs in response to receiving the instruction to select the subset of CCs from the set of CCs, where each of the at least one RE for each CC is on a same BWP that the secure uplink RS was transmitted and the secure downlink RS was received, and the secure uplink RS and the secure downlink RS are quasi-collocated to sound same channels.

Aspect 5 is the apparatus of aspect 4, where the secure uplink RS is SRS.

Aspect 6 is the apparatus of any of aspects 1 to 5, where to communicate with the base station in at least one of the determined subset of CCs, the at least one processor and the memory are further configured to communicate with the base station in a first CC of the determined subset of CCs, and switch from the first CC to a second CC of the determined subset of CCs to communicate with the base station, the switching is based on a number of NACKs transmitted to or received from the base station being greater than or equal to a threshold value.

Aspect 7 is the apparatus of any of aspects 1 to 6, where the determined subset of CCs is used for communication with the base station for subsequent L time units, the time units corresponding with a number of transmissions, a number of slots, or milliseconds of time.

Aspect 8 is the apparatus of aspect 7, where L=K×M, K being the number of CCs in the subset of CCs, and to communicate with the base station, the at least one processor and the memory are further configured to switch through K CCs, after communicating with the base station for M time unit in each of the K CCs.

Aspect 9 is the apparatus of any of aspects 1 to 9, further including a transceiver coupled to the at least one processor.

Aspect 10 is a method of wireless communication for implementing any of aspects 1 to 9.

Aspect 11 is an apparatus for wireless communication including means for implementing any of aspects 1 to 9.

Aspect 12 is a computer-readable medium storing computer executable code, where the code when executed by a processor causes the processor to implement any of aspects 1 to 9.

Aspect 13 is an apparatus for wireless communication at a base station including at least one processor coupled to a memory, the at least one processor and the memory configured to transmit, to a UE, a configuration of a secure uplink reference signal for each CC of a set of CCs, transmit, an instruction to select a subset of CCs from a set of CCs, receive an ACK from the UE in response to transmitting the instruction to select the subset of CCs from the set of CCs, measure the secure uplink RS in at least one RE in each CC of the set of CCs, determine the subset of CCs based on the measured secure uplink RS in the at least one RE in each CC of the set of CCs, and communicate with the UE on at least one CC of the determined subset of CCs.

Aspect 14 is the apparatus of aspect 13, where the secure uplink RS is a secure SRS.

Aspect 15 is the apparatus of any of aspects 13 and 14, where the configuration further includes a secure downlink RS, and the at least one processor and the memory are further configured to transmit, to the UE, the secure downlink RS in the set of CCs in response to transmitting the instruction to select the subset of CCs from the set of CCs, where each of the at least one RE for each CC is on a same BWP that the secure uplink RS was received and the secure downlink RS was transmitted, and the secure uplink RS and the secure downlink RS are quasi-collocated to sound same channels.

Aspect 16 is the apparatus of aspect 15, where the downlink RS is a CSI-RS.

Aspect 17 is the apparatus of any of aspects 13 to 16, where to communicate with the UE in at least one of the determined subset of CCs, the at least one processor and the memory are further configured to communicate with the UE in a first CC of the determined subset of CCs, and switch from the first CC to a second CC of the determined subset of CCs to communicate with the UE, the switching is based on a number of NACKs transmitted to or received from the base station being greater than or equal to a threshold value.

Aspect 18 is the apparatus of any of aspects 13 to 17, where the determined subset of CCs is used for communication with the UE for subsequent L time units, the time units corresponding with a number of transmissions, a number of slots, or milliseconds of time.

Aspect 20 is the apparatus of aspect 19, where L=K×M, K being the number of CCs in the subset of CCs, and to communicate with the UE, the at least one processor and the memory are further configured to switch through K CCs, after communicating with the UE for M time unit in each of the K CCs.

Aspect 21 is the apparatus of any of aspects 13 to 20, further including a transceiver coupled to the at least one processor.

Aspect 22 is a method of wireless communication for implementing any of aspects 13 to 21.

Aspect 23 is an apparatus for wireless communication including means for implementing any of aspects 13 to 21.

Aspect 24 is a computer-readable medium storing computer executable code, where the code when executed by a processor causes the processor to implement any of aspects 13 to 21.

What is claimed is:
1. An apparatus for wireless communication at a user equipment (UE), comprising:
 a memory; and
  at least one processor coupled to the memory, the at least one processor and the memory configured to:

receive, from a base station, a configuration of a secure downlink reference signal (RS) for each component carrier (CC) of a set of CCs;
receive an instruction to select a subset of CCs from the set of CCs;
measure the secure downlink RS in at least one resource element (RE) in each CC of the set of CCs;
determine the subset of CCs based on the measured secure downlink RS in the at least one RE in each CC of the set of CCs; and
communicate with the base station on at least one CC of the determined subset of CCs.

2. The apparatus of claim 1, further comprising a transceiver coupled to the at least one processor, wherein the secure downlink RS is a secure channel status information (CSI) RS (CSI-RS).

3. The apparatus of claim 1, wherein the at least one processor and the memory are further configured to:
transmit an acknowledgement (ACK) to the base station in response to receiving the instruction to select the subset of CCs from the set of CCs.

4. The apparatus of claim 1, wherein the configuration of the secure downlink RS further comprises a configuration of a secure uplink RS, and the at least one processor and the memory are further configured to:
transmit, to the base station, the secure uplink RS in the set of CCs in response to receiving the instruction to select the subset of CCs from the set of CCs,
wherein each of the at least one RE for each CC is on a same bandwidth part (BWP) that the secure uplink RS was transmitted and the secure downlink RS was received, and the secure uplink RS and the secure downlink RS are quasi-collocated to sound same channels.

5. The apparatus of claim 4, wherein the secure uplink RS is sounding reference signal (SRS).

6. The apparatus of claim 1, wherein to communicate with the base station in at least one of the determined subset of CCs, the at least one processor and the memory are further configured to:
communicate with the base station in a first CC of the determined subset of CCs; and
switch from the first CC to a second CC of the determined subset of CCs to communicate with the base station, the switching is based on a number of NACKs transmitted to or received from the base station being greater than or equal to a threshold value.

7. The apparatus of claim 1, wherein the determined subset of CCs is used for communication with the base station for subsequent L time units, the time units corresponding with a number of transmissions, a number of slots, or milliseconds of time.

8. The apparatus of claim 7, wherein L=K×M, K being the number of CCs in the subset of CCs, and to communicate with the base station, the at least one processor and the memory are further configured to:
switch through K CCs, after communicating with the base station for M time unit in each CC of the K CCs.

9. A method of wireless communication at a user equipment (UE), comprising:
receiving, from a base station, a configuration of a secure downlink reference signal for each component carrier (CC) of a set of CCs;
receiving an instruction to select a subset of CCs from the set of CCs;
measuring the secure downlink reference signal (RS) in at least one resource element (RE) in each CC of the set of CCs;
determining the subset of CCs based on the measured secure downlink RS in the at least one RE in each CC of the set of CCs; and
communicating with the base station on at least one CC of the determined subset of CCs.

10. The method of claim 9, wherein the secure downlink RS is a secure channel status information (CSI) RS (CSI-RS).

11. The method of claim 9, further comprising:
transmitting an acknowledgement (ACK) to the base station in response to receiving the instruction to select the subset of CCs from the set of CCs.

12. The method of claim 9, wherein the configuration of the secure downlink RS further comprises a configuration of a secure uplink RS, and method further comprises:
transmitting, to the base station, the secure uplink RS in the set of CCs in response to receiving the instruction to select the subset of CCs from the set of CCs,
wherein each of the at least one RE for each CC is on a same bandwidth part (BWP) that the secure uplink RS was transmitted and the secure downlink RS was received, and the secure uplink RS and the secure downlink RS are quasi-collocated to sound same channels.

13. The method of claim 12, wherein the secure uplink RS is sounding reference signal (SRS).

14. The method of claim 9, wherein communicating with the base station in at least one of the determined subset of CCs further comprises:
communicating with the base station in a first CC of the determined subset of CCs; and
switching from the first CC to a second CC of the determined subset of CCs to communicate with the base station, the switching is based on a number of NACKs transmitted to or received from the base station being greater than or equal to a threshold value.

15. The method of claim 9, wherein the determined subset of CCs is used for communication with the base station for subsequent L time units, the time units corresponding with a number of transmissions, a number of slots, or milliseconds of time.

16. The method of claim 15, wherein L=K×M, K being the number of CCs in the subset of CCs, and communicating with the base station further comprises:
switching through K CCs, after communicating with the base station for M time unit in each CC of the K CCs.

17. An apparatus for wireless communication at a base station, comprising:
a memory; and
at least one processor coupled to the memory, the at least one processor and the memory configured to:
transmit, to a user equipment (UE), a configuration of a secure uplink reference signal (RS) for each component carrier (CC) of a set of CCs;
transmit, an instruction to select a subset of CCs from a set of CCs;
receive an acknowledgement (ACK) from the UE in response to transmitting the instruction to select the subset of CCs from the set of CCs;
measure the secure uplink RS in at least one resource element (RE) in each CC of the set of CCs;
determine the subset of CCs based on the measured secure uplink RS in the at least one RE in each CC of the set of CCs; and communicate with the UE on at least one CC of the determined subset of CCs.

18. The apparatus of claim 17, further comprising a transceiver coupled to the at least one processor, wherein the secure uplink RS is a secure sounding reference signal (SRS).

19. The apparatus of claim 17, wherein the configuration of the secure uplink RS further comprises a configuration of a secure downlink RS, and the at least one processor and the memory are further configured to:
   transmit, to the UE, the secure downlink RS in the set of CCs in response to transmitting the instruction to select the subset of CCs from the set of CCs,
   wherein each of the at least one RE for each CC is on a same bandwidth part (BWP) that the secure uplink RS was received and the secure downlink RS was transmitted, and the secure uplink RS and the secure downlink RS are quasi-collocated to sound same channels.

20. The apparatus of claim 19, wherein the downlink RS is a channel status information (CSI) RS (CSI-RS).

21. The apparatus of claim 17, wherein to communicate with the UE in at least one of the determined subset of CCs, the at least one processor and the memory are further configured to:
   communicate with the UE in a first CC of the determined subset of CCs; and
   switch from the first CC to a second CC of the determined subset of CCs to communicate with the UE, the switching is based on a number of NACKs transmitted to or received from the base station being greater than or equal to a threshold value.

22. The apparatus of claim 17, wherein the determined subset of CCs is used for communication with the UE for subsequent L time units, the time units corresponding with a number of transmissions, a number of slots, or milliseconds of time.

23. The apparatus of claim 22, wherein L=K×M, K being the number of CCs in the subset of CCs, and to communicate with the UE, the at least one processor and the memory are further configured to:
   switch through K CCs, after communicating with the UE for M time unit in each CC of the K CCs.

24. A method of wireless communication at a base station, comprising:
   transmitting, to a user equipment (UE), a configuration of a secure uplink reference signal (RS) for each component carrier (CC) of a set of CCs;
   transmitting, an instruction to select a subset of CCs from a set of CCs;
   receiving an acknowledgement (ACK) from the UE in response to transmitting the instruction to select the subset of CCs from the set of CCs;
   measuring the secure uplink RS in at least one resource element (RE) in each CC of the set of CCs;
   determining the subset of CCs based on the measured secure uplink RS in the at least one RE in each CC of the set of CCs; and
   communicating with the UE on at least one CC of the determined subset of CCs.

25. The method of claim 24, wherein the secure uplink RS is a secure sounding reference signal (SRS).

26. The method of claim 24, wherein the configuration of the secure uplink RS further comprises a configuration of a secure downlink RS, and the method further comprising:
   transmitting, to the UE, the secure downlink RS in the set of CCs in response to transmitting the instruction to select the subset of CCs from the set of CCs,
   wherein each of the at least one RE for each CC is on a same bandwidth part (BWP) that the secure uplink RS was received and the secure downlink RS was transmitted, and the secure uplink RS and the secure downlink RS are quasi-collocated to sound same channels.

27. The method of claim 26, wherein the downlink RS is a channel status information (CSI) RS (CSI-RS).

28. The method of claim 24, wherein communicating with the UE in at least one of the determined subset of CCs further comprises:
   communicating with the UE in a first CC of the determined subset of CCs; and
   switching from the first CC to a second CC of the determined subset of CCs to communicate with the UE, the switching is based on a number of NACKs transmitted to or received from the base station being greater than or equal to a threshold value.

29. The method of claim 24, wherein the determined subset of CCs is used for communication with the UE for subsequent L time units, the time units corresponding with a number of transmissions, a number of slots, or milliseconds of time.

30. The method of claim 29, wherein L=K×M, K being the number of CCs in the subset of CCs, and communicating with the UE further comprises:
   switching through K CCs, after communicating with the UE for M time unit in each CC of the K CCs.

* * * * *